United States Patent
Shimada et al.

(10) Patent No.: US 12,301,998 B2
(45) Date of Patent: May 13, 2025

(54) IMAGING DEVICE AND IMAGING METHOD

(71) Applicant: Sony Group Corporation, Tokyo (JP)

(72) Inventors: Junji Shimada, Tokyo (JP); Hiroshi Yamamoto, Chiba (JP); Makoto Ohta, Tokyo (JP)

(73) Assignee: Sony Group Corporation, Tokyo (JP)

( * ) Notice: Subject to any disclaimer, the term of this patent is extended or adjusted under 35 U.S.C. 154(b) by 178 days.

(21) Appl. No.: 18/016,018

(22) PCT Filed: Jul. 14, 2021

(86) PCT No.: PCT/JP2021/026495
§ 371 (c)(1),
(2) Date: Jan. 13, 2023

(87) PCT Pub. No.: WO2022/019196
PCT Pub. Date: Jan. 27, 2022

(65) Prior Publication Data
US 2023/0224587 A1    Jul. 13, 2023

(30) Foreign Application Priority Data

Jul. 21, 2020   (JP) .................................. 2020-124401

(51) Int. Cl.
H04N 23/68    (2023.01)

(52) U.S. Cl.
CPC ....... *H04N 23/687* (2023.01); *H04N 23/6812* (2023.01)

(58) Field of Classification Search
CPC .... H04N 23/687; H04N 23/6812; H04N 5/92; H04N 23/60; G03B 5/00
See application file for complete search history.

(56) References Cited

U.S. PATENT DOCUMENTS

| 2012/0293675 A1* | 11/2012 | Sato ..................... H04N 23/685 348/208.99 |
| 2015/0264266 A1* | 9/2015 | Katsuyama .......... H04N 23/663 348/208.2 |
| 2021/0092296 A1* | 3/2021 | Kuribayashi ...... H04N 23/6812 |
| 2021/0409603 A1* | 12/2021 | Kajimura ............. H04N 23/683 |

FOREIGN PATENT DOCUMENTS

| JP | H10042233 A | 2/1998 |
| JP | 2016173411 A | 9/2016 |
| JP | 2017220800 A | 12/2017 |
| WO | 2018025639 A1 | 2/2018 |

OTHER PUBLICATIONS

International Search Report (PCT/ISA/210), International Application No. PCT/JP2021/026495, dated Oct. 19, 2021.

* cited by examiner

*Primary Examiner* — Gevell V Selby
(74) *Attorney, Agent, or Firm* — Michael Best & Friedrich LLP

(57) ABSTRACT

An imaging device is configured to perform processing of generating, as metadata associated with a captured image, correction information based on both a first blur correction value related to a first blur correction function of correcting a positional relationship between an optical image incident through a lens and an output captured image and a second blur correction value related to a second blur correction function provided in a lens barrel including the lens.

20 Claims, 17 Drawing Sheets

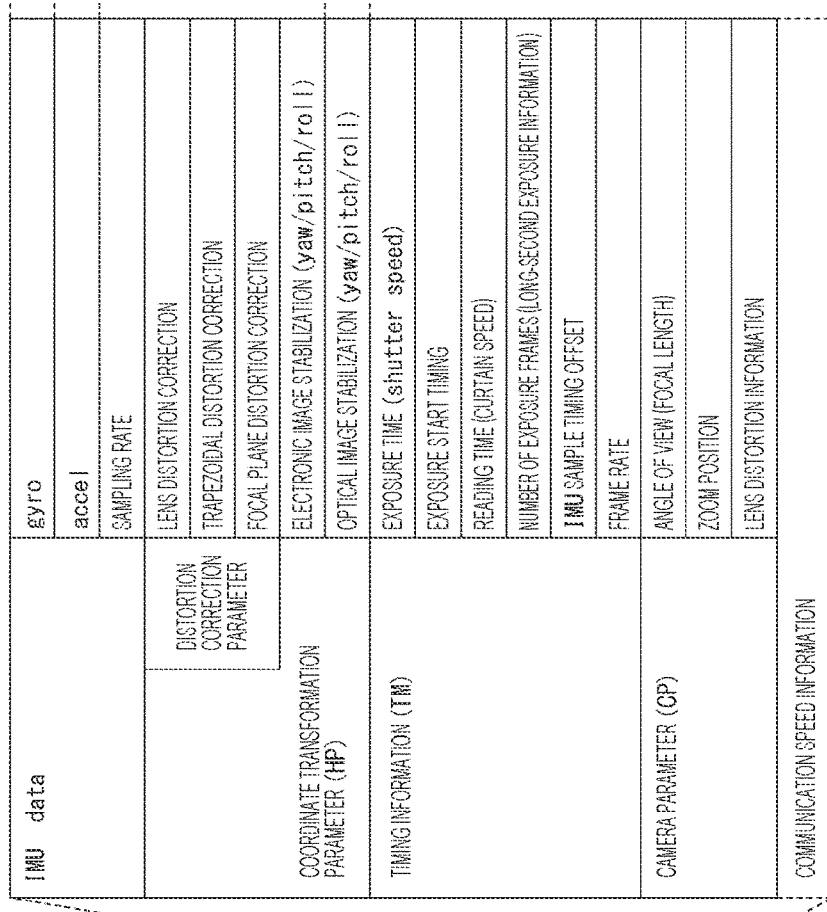
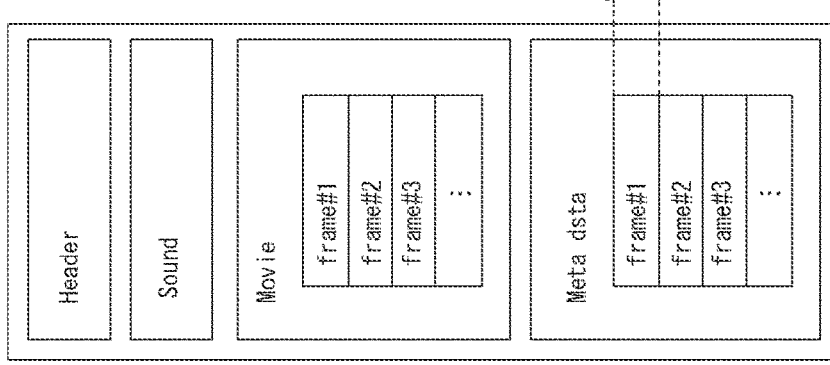
FIG. 5

FIG. 14
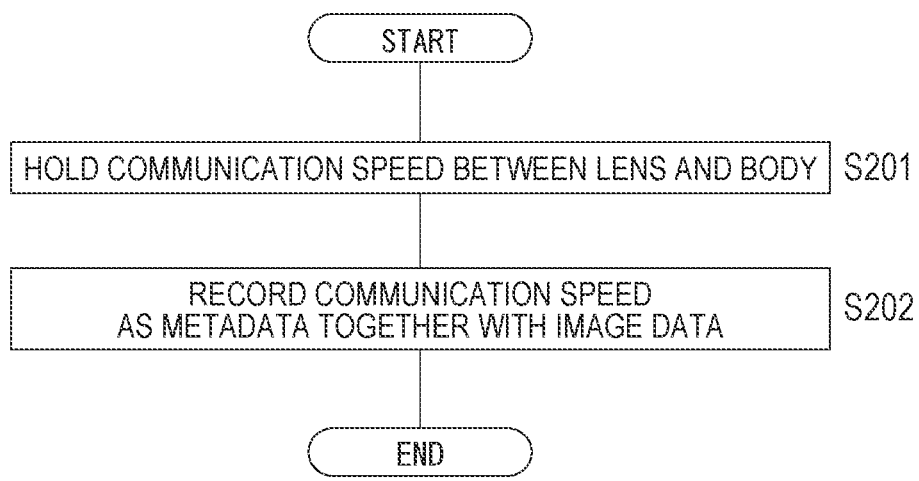
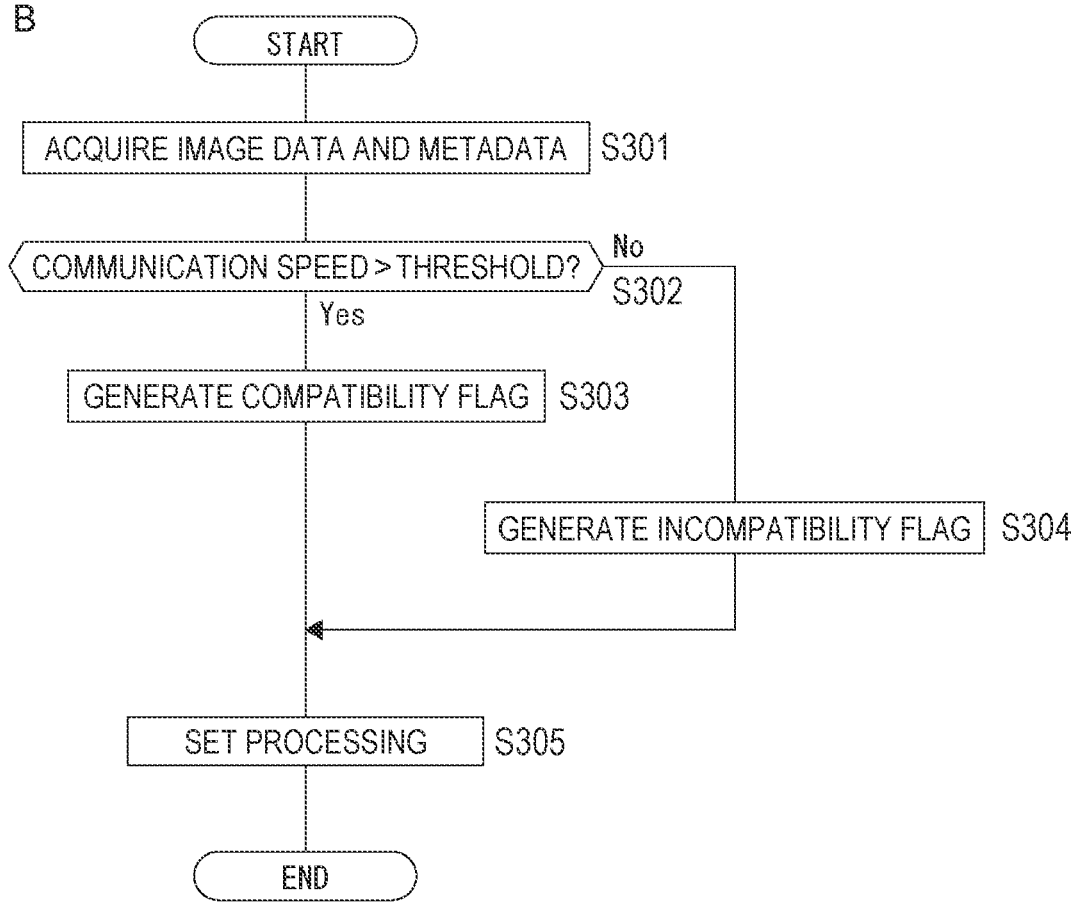

FIG. 15
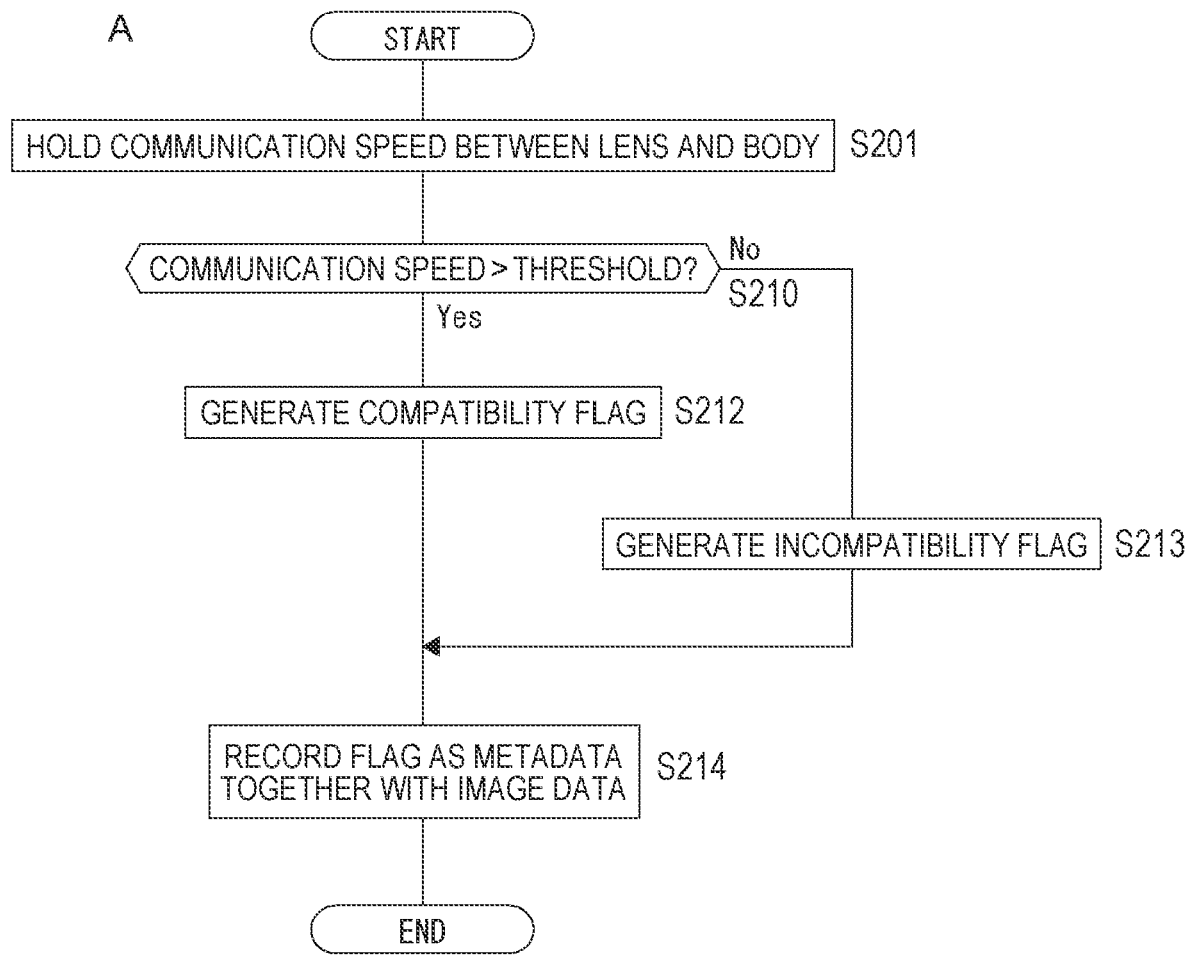
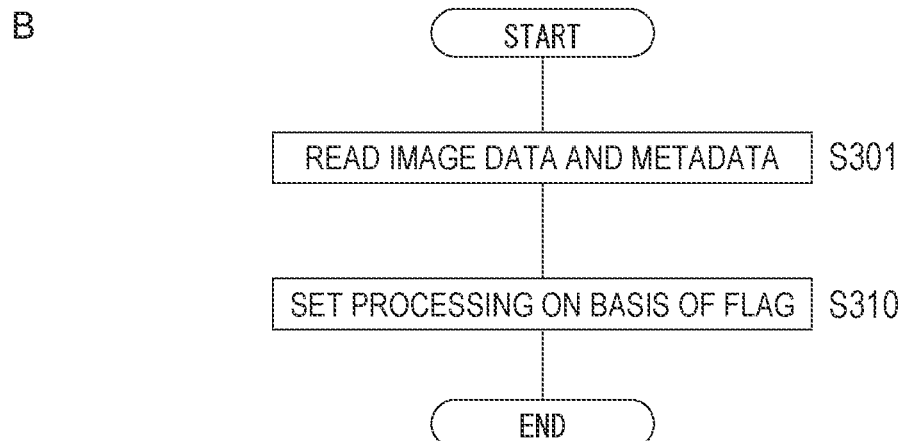

IMAGING DEVICE AND IMAGING METHOD

TECHNICAL FIELD

The present technology relates to an imaging device and an imaging method, and particularly to processing of blur correction data.

BACKGROUND ART

For example, as an interchangeable lens type camera and the like, an imaging device that includes a camera body portion (camera body) and a lens barrel and can record a moving image on a recording medium is known.

Such an imaging device includes a device that performs blur correction by mechanical operation of a blur correction function in a camera body and a device that performs blur correction by mechanical operation of a blur correction function in a lens barrel.

Furthermore, an electronic blur correction function of changing a range of reading an image signal from an imaging element according to a blur or changing a crop range of an image in image signal processing is also known.

Patent Document 1 below discloses a configuration in which blur correction is performed on each of a lens barrel side and a camera body side.

CITATION LIST

Patent Document

Patent Document 1: WO 2018/025639

SUMMARY OF THE INVENTION

Problems to be Solved by the Invention

Recently, there is an environment in which a user can easily perform diverse image capturing, image adjustment, and the like using a mobile terminal such as a smartphone or a tablet, a camera itself, a personal computer, and the like. In this case, there is a case where an influence of a camera shake at the time of imaging is removed with high accuracy, or conversely, a shake is positively applied to an image to obtain a production effect.

Thus, the present disclosure assumes that a shake of an image is added to or removed from a moving image after imaging, and proposes a technique for saving appropriate information in an imaging device for this purpose.

Solutions to Problems

An imaging device according to the present technology includes a control unit that generates, as metadata associated with a captured image, correction information based on both a first blur correction value related to a first blur correction function of correcting a positional relationship between an optical image incident through a lens and an output captured image and a second blur correction value related to a second blur correction function provided in a lens barrel including the lens.

The first blur correction function is a function of correcting the positional relationship between the optical image and the output captured image (image finally output from the imaging device) on a body side.

The second blur correction function is a function provided on the lens barrel side. In a case where each of the lens barrel side and a camera body side has a mechanical or electronic blur correction function in this manner, correction information based on blur correction values on both the lens barrel side and the camera body portion side is associated with a moving image captured as the metadata. For example, the metadata is recorded in a recording medium in a state of being associated with image data.

It is conceivable that the control unit generates the correction information having a smaller amount of data than an amount of data obtained in a case where an amount of data of the first blur correction value and an amount of data of the second blur correction value are added in the imaging device according to the present technology described above.

If both the first blur correction value and the second blur correction value are directly set as the correction information, the amount of data recorded as the metadata increases. Thus, information including the first blur correction value and the second blur correction value is obtained with a smaller amount of data.

It is conceivable that the control unit sets, as the correction information, one blur correction value out of the first blur correction value and the second blur correction value and conversion information configured to obtain another blur correction value using the one blur correction value in the imaging device according to the present technology described above.

One of the first blur correction value and the second blur correction value is recorded and conversion information corresponding to, for example, a ratio, a difference, or the like between the first blur correction value and the second blur correction value is recorded as the conversion information, so that the first blur correction value and the second blur correction value are obtained from the metadata.

It is conceivable that the control unit sets, as the correction information, the first blur correction value and conversion information configured to obtain the second blur correction value using the first blur correction value in the imaging device according to the present technology described above.

Since the first blur correction value and the conversion information are recorded, the first blur correction value and the second blur correction value can be obtained from the metadata.

It is conceivable that the control unit generates the correction information including a pair of one blur correction value out of the first blur correction value and the second blur correction value and conversion information configured to obtain another blur correction value using the one blur correction value every predetermined timing in the imaging device according to the present technology described above.

For example, in a case where the metadata is recorded in association with a frame of an image, a set of one blur correction value and the conversion information is recorded in association with each frame.

It is conceivable that the control unit generates the correction information including one blur correction value out of the first blur correction value and the second blur correction value at each timing and conversion information configured to obtain another blur correction value using the one blur correction value at a timing when a ratio between the first blur correction value and the second blur correction value has changed in the imaging device according to the present technology described above.

That is, the conversion information is recorded only when the ratio between the first blur correction value and the second blur correction value has changed.

It is conceivable that the control unit sets a ratio between the first blur correction value and the second blur correction value to a fixed ratio from a recording start to a recording end of a moving image, and generates the correction information including one blur correction value out of the first blur correction value and the second blur correction value at each timing and conversion information according to the fixed ratio, the conversion information being configured to obtain another blur correction value using the one blur correction value in the imaging device according to the present technology described above.

That is, it is sufficient to record only one piece of the conversion information in association with the moving image.

It is conceivable that the control unit uses a composite correction value of the first blur correction value and the second blur correction value as the correction information in the imaging device according to the present technology described above.

As the composite correction value of the first blur correction value and the second blur correction value, a correction value of the entire imaging device is recorded as the metadata.

It is conceivable that the control unit sets the first blur correction value and the second blur correction value as the correction information, and performs processing of recording communication speed information between the lens barrel and a camera body portion as metadata in a recording medium in the imaging device according to the present technology described above.

Both the first blur correction value and the second blur correction value are directly used as the correction information and recorded as the metadata. In addition, the communication speed information between the lens barrel side and the camera body portion side is also recorded as the metadata.

It is conceivable that the communication speed information is a value indicating a communication speed in the imaging device according to the present technology described above.

The communication speed between the lens barrel and the camera body portion is directly used as the metadata.

It is conceivable that the communication speed information is result information obtained by comparing a communication speed with a predetermined value in the imaging device according to the present technology described above.

For example, flag information indicating whether the communication speed between the lens barrel and the camera body portion is fast or slow is used as the metadata.

It is conceivable that a blur correction value is a correction execution value indicating a position or a positional displacement amount according to correction of a blur correction function in the imaging device according to the present technology described above.

The first blur correction value or the second blur correction value is set as a position or a positional displacement amount when the blur correction of the first blur correction function or the second blur correction function is actually executed.

It is conceivable that a blur correction value is a correction instruction value giving an instruction on a position or a positional displacement amount for correction of a blur correction function in the imaging device according to the present technology described above.

An instruction on a position or a positional displacement amount for blur correction of the first blur correction function or the second blur correction function is given to execute displacement for the blur correction. The correction instruction value is used as the blur correction value to be reflected in the metadata.

It is conceivable that the control unit uses information detected by a blur detection unit as the metadata in the imaging device according to the present technology described above For example, in a case where a sensor such as a gyro is provided, the metadata includes shake information obtained by sensing by the sensor.

An imaging method according to the present technology including processing of generating, as metadata associated with a captured image, correction information based on both a first blur correction value related to a first blur correction function of correcting a positional relationship between an optical image incident through a lens and an output captured image and a second blur correction value related to a second blur correction function provided in a lens barrel including the lens, the processing being performed by an imaging device.

Therefore, when an image is captured, the blur correction values on both the lens barrel side and the main body side can be referred to from the metadata.

BRIEF DESCRIPTION OF DRAWINGS

FIG. 5 is an explanatory diagram of metadata according to the embodiment.

FIG. 14 is a flowchart of recording of communication speed information according to the fifth embodiment.

FIG. 15 is a flowchart of recording of communication speed information according to a sixth embodiment.

MODE FOR CARRYING OUT THE INVENTION

Hereinafter, embodiments will be described in the following order.
1. Interframe Shake Modification by Imaging Device and Image Processing Device
2. Configuration of Imaging Device and Metadata
3. Functions of Image Processing Device
4. First Embodiment
5. Second Embodiment
6. Third Embodiment
7. Fourth Embodiment
8. Fifth Embodiment
9. Sixth Embodiment
10. Seventh Embodiment
11. Summary and Modifications

Figure 1:
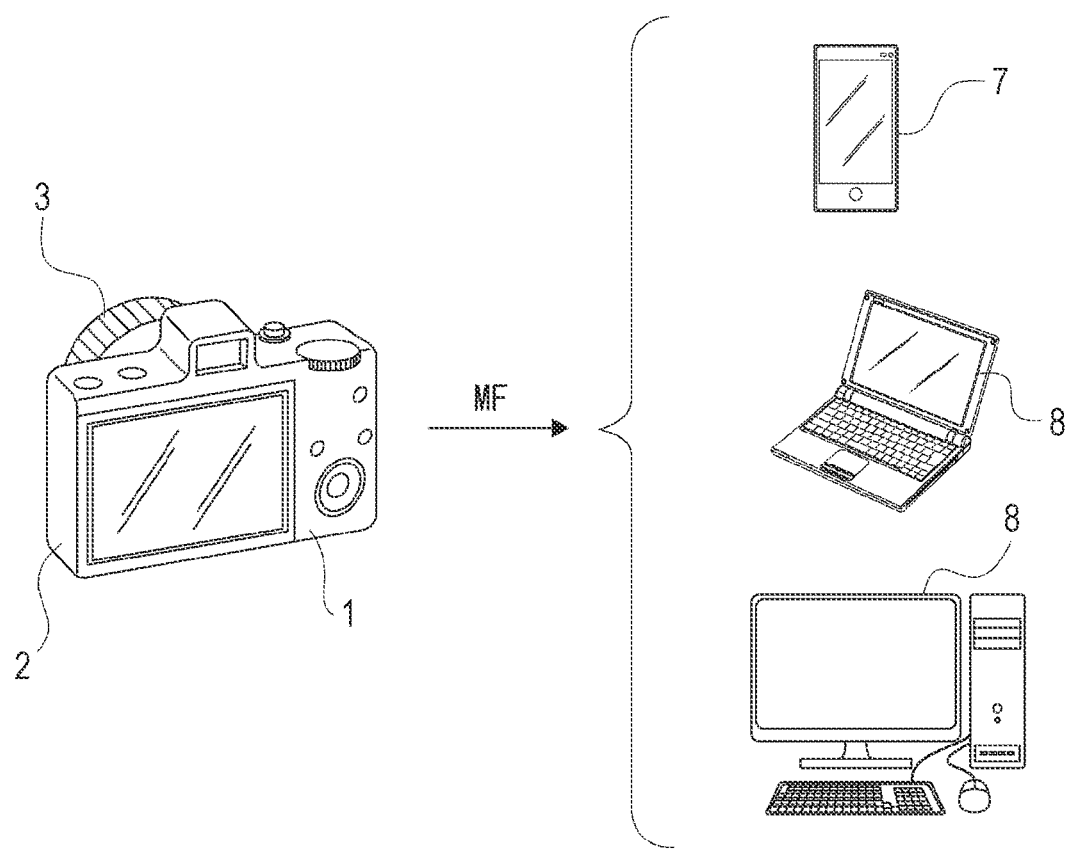
FIG. 1 is an explanatory diagram of an imaging device and an image processing device according to an embodiment of the present technology.

1. Interframe Shake Modification by Imaging Device and Image Processing Device FIG. 1 illustrates examples of an imaging device 1 according to an embodiment and image processing devices (5, 6) acquiring image files MF captured by the imaging device 1.

The drawing illustrates an example in which a mobile terminal 7 and a personal computer 8 function as the image processing devices 5 and 6. Although not illustrated, various devices, such as a device dedicated for image editing, a cloud server, a television device, and a video recording and reproducing device, are assumed as the image processing devices 5 and 6. These devices can function as any of the image processing devices 5 and 6.

The image processing device 5 is a device that primarily performs interframe shake modification processing on image data acquired from the imaging device 1.

On the other hand, the image processing device 6 is a device that secondarily performs interframe shake modification processing on image data that has been already subjected to interframe shake modification processing in the other image processing device.

Note that the "shake" refers to an interframe shake of an image constituting a moving image. It is assumed that the "shake" broadly indicates vibration components (fluctuations of an image between frames) generated between the frames, such as a shake of the image caused by a camera shake or the like in the image captured by the imaging device 1 and a shake intentionally added by image processing.

The term "camera shake" is also used in the case of referring to a "shake" caused by the camera shake or the like at the time of imaging by the imaging device 1. Correction performed in the imaging device 1 to reduce the shake of the image caused by the camera shake or the like (including vibrations or the like applied when the imaging device 1 is fixedly arranged without being held by a hand) is referred to as "image stabilization" to be distinguished from "interframe shake modification" processing in the image processing devices 5 and 6.

The "interframe shake modification" refers to changing a state of a shake in an image, such as reducing the shake occurring in the image or adding the shake to the image.

It is assumed that the "interframe shake modification" includes the following "interframe shake reduction" and "interframe shake production".

The "interframe shake reduction" refers to eliminating (entirely removing a shake) or reducing (partially removing a shake) of a shake occurring in an image caused by a camera shake or the like at the time of imaging in the image processing devices 5 and 6.

The "interframe shake production" refers to changing a state of a shake of an image in the image processing devices 5 and 6. There is a case where a shake is reduced as this interframe shake production, which is similar to the "interframe shake reduction" as a result in such a sense. However, in the present embodiment, the "interframe shake production" refers to changing the state of the shake of the image according to an instruction, the instruction regarding a change amount of the shake being given by an operation of a user or automatic control.

For example, reducing or increasing a shake generated at the time of imaging according to a user instruction or the like, or newly adding a blur corresponds to the "interframe shake production".

Note that it is assumed that an image is intentionally shaken in order to give an impression to a scene of a moving image as an example of the purpose of the interframe shake production.

The imaging device 1 in FIG. 1 is configured as a so-called digital still camera or a digital video camera to be capable of capturing at least a moving image.

A camera body portion of the imaging device 1 is illustrated as a camera body 2.

A lens barrel 3 functions as a so-called interchangeable lens, and is attachable to and detachable from the camera body portion (camera body 2) of the imaging device 1. The user can replace and use the lens barrel 3 according to a use case.

Note that such an interchangeable lens type imaging device 1 is assumed in the embodiment, but the technology of the present disclosure can also be applied to a type in which the lens barrel 3 is not removable from the camera body 2.

The imaging device 1 can capture a moving image and transfer the image file MF obtained by capturing the moving image to the mobile terminal 7, the personal computer 8, or the like serving as the image processing device 5 via wired communication or wireless communication. Alternatively, the imaging device 1 may record the image file MF in a recording medium such as a memory card, and the mobile terminal 7 or the personal computer 8 may read the image file MF from the memory card.

Furthermore, the image file MF includes not only image data as the moving image but also metadata as additional information corresponding to the image data.

Figure 2:
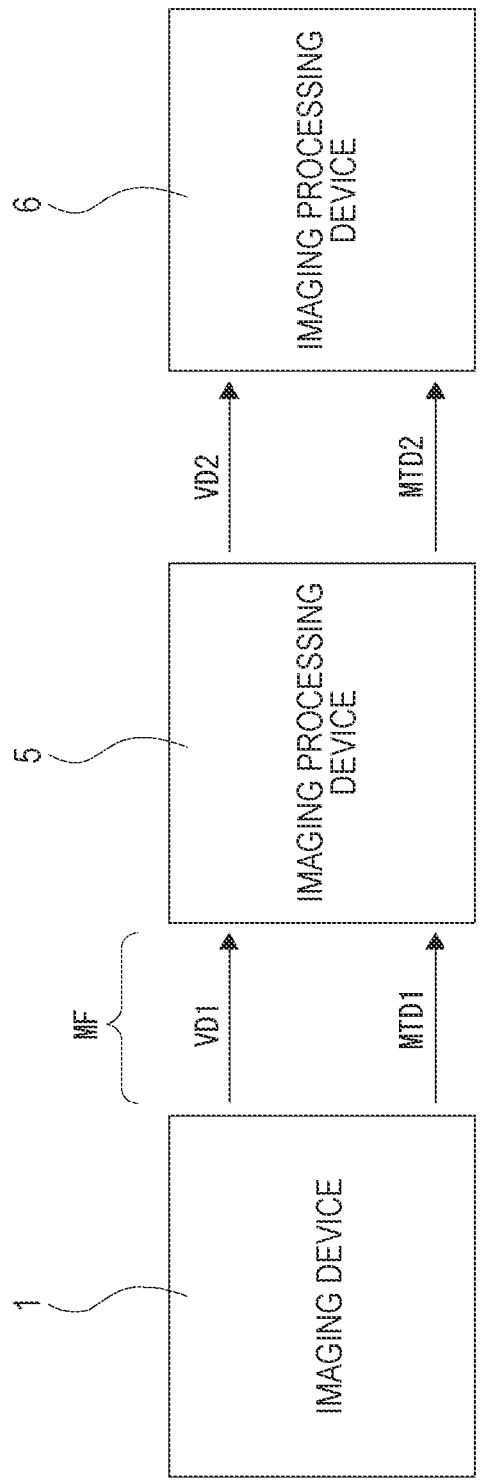
FIG. 2 is an explanatory diagram of a flow of data of the imaging device and the image processing device according to the embodiment.

FIG. 2 illustrates a state of information transmission in the imaging device 1, the image processing device 5, and the image processing device 6.

Image data VD1 and metadata MTD1 are transmitted from the imaging device 1 to the image processing device 5 via wired communication, wireless communication, or a recording medium.

The image data VD1 and the metadata MTD1 are, for example, information transmitted as the image file MF.

In the case of the present embodiment, the metadata MTD1 includes, for example, information regarding image stabilization at the time of imaging.

The image processing device 5 can receive the image data VD1 and the metadata MTD1 and perform various types of processing.

For example, the image processing device 5 can perform interframe shake modification processing on the image data VD1 using the information regarding image stabilization included in the metadata MTD1.

As described above, the interframe shake modification is a process of canceling image stabilization to return to an original image with a shake, performing more advanced interframe shake reduction, or adding a shake to an image for production.

The image processing device 5 can further transfer image data VD2 obtained by performing the interframe shake modification processing or the like and metadata MTD2 to the other image processing device 6.

In this case, information regarding the interframe shake modification processing or the like is added as the metadata MTD2, and thus, various interframe shake modifications can also be performed by the image processing device 6.

In the present embodiment, at least the interframe shake modification in the image processing device 5 can be appropriately performed on the assumption of such information transmission. The description will be given focusing on metadata recording at the time of imaging in the imaging device 1 for such a purpose.

2. Configuration of Imaging Device and Metadata

Figure 3:
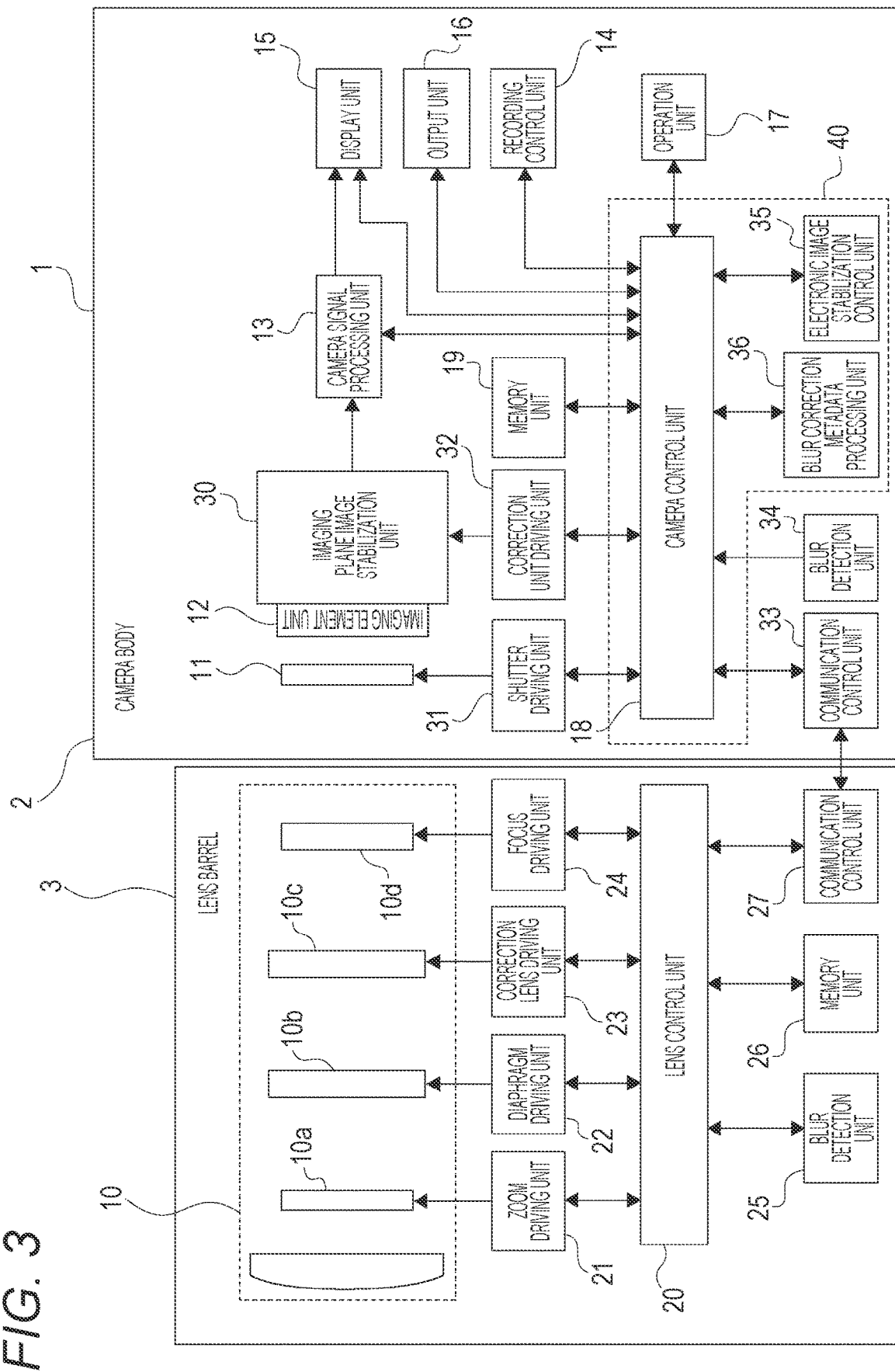
FIG. 3 is a block diagram of a configuration example of the imaging device according to the embodiment.

FIG. 3 illustrates configuration examples of the imaging device 1 and the lens barrel 3.

A lens system 10 having a plurality of optical components is formed in the lens barrel 3. For example, the lens system 10 includes a zoom lens 10a, a diaphragm mechanism 10b, an image stabilization lens mechanism 10c, a focus lens 10d, and the like.

The image stabilization lens mechanism 10c is a mechanism that reduces the shake occurring in the image by mechanically driving the lens with respect to the camera shake.

Light (incident light) from a subject is collected on an imaging element unit 12 via such a lens system 10 and a shutter 11 in the camera body 2.

The imaging element unit 12 includes, for example, an image sensor (imaging element) of a complementary metal oxide semiconductor (CMOS) type, a charge coupled device (CCD) type, or the like.

The imaging element unit 12 performs, for example, correlated double sampling (CDS) processing, automatic gain control (AGC) processing, and the like on an electric signal obtained by photoelectrically converting light received by the image sensor, and further performs analog/digital (A/D) conversion processing. Then, an imaging signal as digital data is output to a camera signal processing unit 13 in the subsequent stage.

The imaging element unit 12 is provided with an imaging plane image stabilization unit 30.

The imaging plane image stabilization unit 30 is a mechanism that corrects the shake of the image by mechanically moving the image sensor with respect to the camera shake or the like.

The camera signal processing unit 13 is configured as an image processing processor using, for example, a digital signal processor (DSP) or the like. The camera signal processing unit 13 performs various types of signal processing on a digital signal (captured image signal) from the imaging element unit 12. For example, as a camera process, the camera signal processing unit 13 performs pre-processing, synchronization processing, YC generation processing, various types of correction processing, resolution conversion processing, codec processing, and the like.

In the pre-processing, clamp processing of clamping black levels of R, G, and B to a predetermined level, correction processing between color channels of R, G, and B, and the like are performed on the captured image signal from the imaging element unit 12.

In the synchronization processing, color separation processing is performed such that image data for each pixel has all color components of R, G, and B. For example, in the case of an imaging element using a Bayer array color filter, demosaic processing is performed as the color separation processing.

In the YC generation processing, a luminance (Y) signal and a color (C) signal are generated (separated) from image data of R, G, and B.

In the resolution conversion processing, the resolution conversion processing is executed on image data subjected to various types of signal processing.

Figure 4:
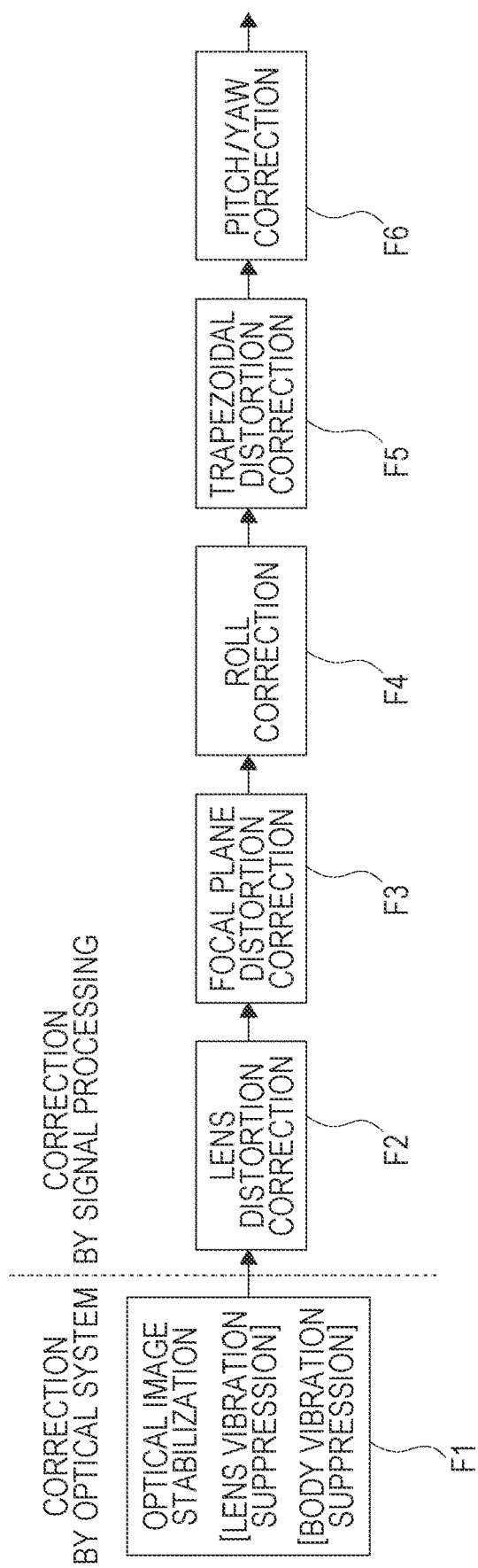
FIG. 4 is an explanatory diagram of correction processing of the imaging device according to the embodiment.

FIG. 4 exemplifies various types of correction processing performed by the lens system 10 to the camera signal processing unit 13. FIG. 4 illustrates optical image stabilization performed by the image stabilization lens mechanism 10c and the imaging plane image stabilization unit 30 and correction processing performed by the camera signal processing unit 13 in the execution order.

As the optical image stabilization in a process F1, lens vibration suppression by the image stabilization lens mechanism 10c and body vibration suppression by the imaging plane image stabilization unit 30 are performed.

For example, image stabilization as the lens vibration suppression performed by shifting the image stabilization lens mechanism 10c in a yaw direction and a pitch direction and image stabilization as the body vibration suppression performed by shifting the image sensor in the yaw direction and the pitch direction of the image sensor by the imaging plane image stabilization unit 30 are performed such that an image of the subject is formed on the image sensor in a state where an influence of the camera shake has been physically canceled.

Only one of the lens vibration suppression and the body vibration suppression is executed in some cases, and the both are executed in other cases.

Note that electrical image stabilization may be performed in addition to the above optical image stabilization as the image stabilization.

In the camera signal processing unit 13, processing from a process F2 to a process F6 is performed by spatial coordinate transformation for each pixel.

In the process F2, lens distortion correction is performed.

In the process F3, focal plane distortion correction as one element of the electrical image stabilization is performed. Note that this corrects distortion in a case where reading by a rolling shutter scheme is performed by a CMOS image sensor, for example.

In the process F4, roll correction is performed. That is, roll component correction as one element of the electrical image stabilization is performed.

In the process F5, trapezoidal distortion correction is performed for a trapezoidal distortion amount caused by the electrical image stabilization. The trapezoidal distortion amount caused by the electrical image stabilization is perspective distortion caused by cutting out a place away from the center of an image.

In the process F6, shifting or cropping in the pitch direction and the yaw direction as one element of the electrical image stabilization is performed.

For example, the image stabilization, the lens distortion correction, and the trapezoid distortion correction are performed in the above procedure.

Note that it is not essential to perform all the processes exemplified here, and the order of the processes may be appropriately changed.

In the codec processing in the camera signal processing unit 13 of FIG. 3, for example, encoding processing for recording and communication and file generation are performed on the image data subjected to the above-described various types of processing. For example, the image file MF is generated in an MP4 format or the like used for recording a moving image and audio conforming to MPEG-4. Furthermore, it is also conceivable to generate a file in a format, such as Joint Photographic Experts Group (JPEG), Tagged Image File Format (TIFF), or Graphics Interchange Format (GIF), as a still image file.

Note that an audio processing system is not illustrated in FIG. 3, but an audio recording system and an audio processing system are actually provided, and the image file MF may include audio data together with the image data as a moving image.

The camera control unit 18 is configured using a microcomputer (arithmetic processing device) including a central processing unit (CPU).

The memory unit 19 stores information and the like used for processing by the camera control unit 18. The memory unit 19 illustrated in the drawing comprehensively represents, for example, a read only memory (ROM), a random access memory (RAM), a flash memory, and the like.

The RAM in the memory unit 19 is used for temporary storage of data, a program, and the like as a work area during various types of data processing of the CPU of the camera control unit 18.

The ROM and the flash memory (non-volatile memory) in the memory unit 19 are used for storage of an operating system (OS) configured for the CPU to control the respective units, content files such as image files, application programs for various operations, firmware, and the like.

The memory unit 19 may be a memory area built in a microcomputer chip serving as the camera control unit 18 or may be configured using a separate memory chip.

The camera control unit 18 executes the programs stored in the ROM, the flash memory, and the like of the memory unit 19 to control the entire imaging device 1 and the lens barrel 3.

For example, the camera control unit 18 controls operations of the respective necessary units regarding control of a shutter speed of the imaging element unit 12, instructions of the various types of signal processing in the camera signal processing unit 13, an imaging operation or a recording operation according to an operation of the user, a reproduction operation of a recorded image file, operations of the lens system 10, such as zooming, focusing, and diaphragm adjustment in the lens barrel 3, a user interface operation, and the like.

Furthermore, the camera control unit 18 also performs various types of processing and output control for the image data processed by the camera signal processing unit 13.

The camera control unit 18 can cause an electrical image stabilization control unit 35 to execute the electrical image stabilization processing on the image data.

Furthermore, the camera control unit 18 causes a blur correction metadata processing unit 36 to execute metadata generation related to blur correction. The camera control unit 18 also performs control to generate metadata constituted by various types of information including information regarding the blur correction and record the metadata as information related to the image file MF.

Furthermore, the camera control unit 18 communicates with the lens control unit 20 on the lens barrel 3 side via the communication control unit 33.

Note that FIG. 3 illustrates the electrical image stabilization control unit 35 and the blur correction metadata processing unit 36 as separate blocks from the camera control unit 18, but these can be considered as functions implemented by the microcomputer constituting the camera control unit 18. Thus, the camera control unit 18, the electrical image stabilization control unit 35, and the blur correction metadata processing unit 36 are collectively referred to as a "control unit 40" for the sake of the description. Meanwhile, these may be configured using separate arithmetic processing devices.

The recording control unit 14 performs recording and reproduction on a recording medium configured using a non-volatile memory, for example. For example, the recording control unit 14 performs a process of recording the image file MF, such as moving image data or still image data, a thumbnail image, and the like on the recording medium.

Actual forms of the recording control unit 14 can be diversely considered. For example, the recording control unit 14 may be configured as a flash memory built in the imaging device 1 and a write/read circuit thereof, or may be provided in a form of a card recording and reproduction unit that accesses a recording medium, which can be attached to and detached from the imaging device 1, for example, a memory card (portable flash memory or the like) for recording and reproduction. Furthermore, the recording control unit 14 may be achieved as a hard disk drive (HDD) or the like as a form built in the imaging device 1.

The display unit 15 is a display unit that performs various displays for the user, and is, for example, a display panel or a viewfinder using a display device such as a liquid crystal display (LCD) or an organic electro-luminescence (EL) display arranged in a housing of the imaging device 1.

The display unit 15 executes various displays on a display screen on the basis of an instruction from the camera control unit 18.

For example, the display unit 15 displays a reproduced image of image data read from the recording medium in the recording control unit 14.

Furthermore, there is a case where image data of a captured image whose resolution has been converted for a display by the camera signal processing unit 13 is supplied to the display unit 15, and the display unit 15 performs the display on the basis of the image data of the captured image in response to an instruction from the camera control unit 18. Therefore, a so-called through image (subject monitoring image), which is a captured image during composition confirmation, is displayed.

Furthermore, the display unit 15 executes displays of various operation menus, icons, messages, and the like, that is, graphical user interfaces (GUIs) on the screen on the basis of an instruction from the camera control unit 18.

The output unit 16 performs data communication and network communication with external devices in a wired or wireless manner.

For example, captured image data (a still image file or a moving image file) is transmitted and output to external display device, recording device, reproduction device, and the like.

Furthermore, the output unit 16 may perform communication via various networks, such as the Internet, a home network, and a local area network (LAN) as a network communication unit to transmit and receive various types of data to and from a server, a terminal, or the like on the network.

The operation unit 17 collectively represents input devices configured for the user to perform various operation inputs. Specifically, the operation unit 17 represents various operation elements (a key, a dial, a touch panel, a touch pad, and the like) provided in the housing of the imaging device 1.

An operation of the user is detected by the operation unit 17, and a signal corresponding to the input operation is transmitted to the camera control unit 18.

A shutter driving unit 31 drives the shutter 11 on the basis of an instruction from the camera control unit 18.

A correction unit driving unit 32 drives the imaging plane image stabilization unit 30 on the basis of an instruction from the camera control unit 18, and displaces the image sensor in the imaging element unit 12 for the optical image stabilization.

A blur detection unit 34 represents a sensor that detects a shake applied to the camera body 2. As the blur detection unit 34, for example, an inertial measurement unit (IMU) is mounted, and, for example, an angular velocity can be detected by an angular velocity (gyro) sensor of three axes of pitch, yaw, and roll, and acceleration can be detected by an acceleration sensor.

Note that it is sufficient for the blur detection unit 34 to include a sensor capable of detecting the camera shake at the time of imaging, and does not need to include both the gyro sensor and the acceleration sensor.

The lens barrel 3 is equipped with the lens control unit 20 configured using a microcomputer, for example.

In a state where the lens barrel 3 is mounted on the camera body 2, the camera control unit 18 and the lens control unit 20 can communicate with each other via communication control units 27 and 33.

The communication control units 27 and 33 are connected in a wired manner to perform communication as the lens barrel 3 is mounted on the camera body 2. However, the both may be configured to perform wireless communication.

The lens control unit 20 and the camera control unit 18 regularly perform bidirectional data communication at a certain communication speed.

For example, the camera control unit 18 instructs the lens control unit 20 to drive the zoom lens 10a, the focus lens 10d, the diaphragm mechanism 10b, and the image stabilization lens mechanism 10c. The lens control unit 20 causes the operations of the lens system 10 to be executed in response to instructions for driving these.

Furthermore, the lens control unit 20 transmits lens distortion correction information, focal length information, a corrected lens position of the image stabilization lens mechanism 10c, and the like to the camera control unit 18.

The lens barrel 3 is provided with, for example, a zoom driving unit 21 including a motor that drives the zoom lens 10a and a motor driver, a diaphragm driving unit 22 including a motor that drives the diaphragm mechanism 10b and a motor driver, a correction lens driving unit 23 including a motor that drives the image stabilization lens mechanism 10c and a motor driver, and a focus driving unit 24 including a motor that drives the focus lens 10d and a motor driver.

The zoom driving unit 21, the diaphragm driving unit 22, the correction lens driving unit 23, and the focus driving unit 24 apply driving currents to the corresponding motors in response to instructions from the lens control unit 20 based on instructions from the camera control unit 18. Therefore, a zoom operation, a diaphragm opening/closing operation, an optical image stabilization operation, and a focus operation are executed.

The memory unit 26 stores information and the like used for processing by the lens control unit 20. The memory unit 26 comprehensively represents, for example, a ROM, a RAM, a flash memory, and the like. The memory unit 26 is sometimes used for the purpose of temporarily saving information transmitted from the lens control unit 20 to the camera control unit 18.

The blur detection unit 25 represents a sensor that detects a shake in the lens barrel 3, and it is assumed that an IMU is mounted, for example, similarly to the blur detection unit 34 on the camera body 2 side. Note that a case where the blur detection unit 34 is not mounted in the lens barrel 3 is also assumed.

Next, a content of the image file MF and a content of the metadata transmitted from the imaging device 1 to the image processing device 5 will be described.

FIG. 5A illustrates data included in the image file MF. As illustrated, the image file MF includes various types of data as a "header", "sound", a "movie", and "metadata".

In the "header", information indicating the presence or absence of the metadata and the like are described together with information such as a file name and a file size.

"Sound" is audio data recorded together with a moving image. For example, two-channel stereo audio data is stored.

The "movie" is moving image data, and includes pieces of image data as frames (#1, #2, #3, and so on) constituting the moving image.

As the "metadata", additional information associated with the respective frames (#1, #2, #3, and so on) constituting the moving image is described.

An example of the content of the metadata is illustrated in FIG. 5B. For example, IMU data, a coordinate transformation parameter HP, timing information TM, and a camera parameter CP are described for one frame. Note that these are part of the content of the metadata, and there may be other information. Furthermore, there is a case where any information illustrated in the drawing is not included.

Furthermore, FIG. 5B illustrates a case where the metadata includes communication speed information by a broken line, which is a case where processing according to a fifth or sixth embodiment as described later is performed.

As the IMU data, a gyro (angular velocity data), an accelerator (acceleration data), and a sampling rate are described.

The IMU mounted on the imaging device 1 as the blur detection units 34 and 25 outputs the angular velocity data and the acceleration data at a predetermined sampling rate. In general, this sampling rate is higher than a frame rate of the captured image, and thus, many IMU data samples are obtained in one frame period.

Therefore, as the angular velocity data, n samples are associated with one frame, such as a gyro sample #1, a gyro sample #2, . . . , and a gyro sample #n illustrated in FIG. 5C.

Furthermore, as the acceleration data, m samples are associated with one frame, such as an accelerator sample #1, an accelerator sample #2, . . . , and an accelerator sample #m.

There may be a case where n=m, and there may be a case where n≠m.

Note that the example in which the metadata is associated with each frame has been described herein, but there is a case where the IMU data is not completely synchronized with the frame, for example. In such a case, for example, time information associated with time information of each frame is held as an IMU sample timing offset in the timing information TM.

The coordinate transformation parameter HP is a generic term for parameters used for correction accompanied by coordinate transformation of each pixel in the image. For example, non-linear coordinate transformation, such as lens distortion, is also included.

Then, the coordinate transformation parameter HP is a term that can include at least a lens distortion correction parameter, a trapezoid distortion correction parameter, a focal plane distortion correction parameter, an electrical image stabilization parameter, and an optical image stabilization parameter.

The lens distortion correction parameter is information for directly or indirectly grasping how distortion such as barrel aberration and pincushion aberration has been corrected and returning to an image before the lens distortion correction.

The trapezoid distortion correction parameter is a correction amount at the time of correcting trapezoid distortion caused by shifting a crop area from the center by the electrical image stabilization, and also has a value according to a correction amount of the electrical image stabilization.

The focal plane distortion correction parameter is a value indicating a correction amount for each line with respect to focal plane distortion.

Regarding the electrical image stabilization and the optical image stabilization, parameters indicating correction amounts for the respective axial directions of yaw, pitch, and roll are used.

Here, in the present embodiment, the image stabilization lens mechanism 10c and the imaging plane image stabilization unit 30 are provided as an optical image stabilization mechanism as described in FIG. 3. Therefore, as correction information indicating the correction amount of the optical image stabilization, a body-side blur correction value and a lens-side blur correction value are recorded, for example, as illustrated in FIG. 5D.

The body-side blur correction value is a blur correction value in the imaging plane image stabilization unit 30.

The lens-side blur correction value is a blur correction value in the image stabilization lens mechanism 10c.

It is assumed that these blur correction values are set as actual correction execution values of the imaging plane image stabilization unit 30 and the image stabilization lens mechanism 10c. This correction effective value is a value representing actual displacement performed as the optical image stabilization such as position information changed by actual correction or a displacement amount of position information from a previous frame detected by a position sensor provided in the imaging plane image stabilization unit 30 or the image stabilization lens mechanism 10c.

Alternatively, these blur correction values may be a correction instruction value output from the camera control unit 18 to the correction unit driving unit 32 and a correction instruction value transmitted from the camera control unit 18 to the correction lens driving unit 23 via the lens control unit 20. This is because the imaging plane image stabilization unit 30 and the image stabilization lens mechanism 10c are driven so as to have a position and a positional displacement amount corresponding to these correction instruction values.

Furthermore, as the correction information regarding the optical image stabilization, there is an example in which the body-side blur correction value and conversion information are recorded as illustrated in FIG. 5E. This will be described in first to third embodiments.

Furthermore, as the correction information regarding the optical image stabilization, there is an example in which both the body-side blur correction value and the lens-side blur correction value are combined, and a composite correction value, which is the amount of blur correction added in the entire imaging device 1 is recorded as illustrated in FIG. 5F. This will be described in a fourth embodiment.

Note that the respective parameters of the lens distortion correction, the trapezoid distortion correction, the focal plane distortion correction, and the electrical image stabilization are collectively referred to as the coordinate transformation parameters since such correction processing is correction processing on an image formed on each pixel of the image sensor of the imaging element unit 12 and the parameters are parameters of the correction processing accompanied by coordinate transformation of each pixel.

Furthermore, the correction information of the optical image stabilization is also set as one of the coordinate transformation parameters for the sake of the description since the correction of a shake of an interframe component is processing accompanied by coordinate transformation of each pixel in the optical image stabilization.

That is, when inverse correction is performed using these parameters, image data subjected to the lens distortion correction, the trapezoid distortion correction, the focal plane distortion correction, the electrical image stabilization, and the optical image stabilization can be returned to a state before each correction processing, that is, the state when an image has been formed on the image sensor of the imaging element unit 12.

Furthermore, the respective parameters of the lens distortion correction, the trapezoid distortion correction, and the focal plane distortion correction are collectively referred to as optical distortion correction parameters since such correction processing is distortion correction processing for a case where an optical image from a subject itself is an image captured in an optically distorted state and aims for optical distortion correction.

That is, when the inverse correction is performed using these parameters, image data subjected to the lens distortion correction, the trapezoid distortion correction, and the focal plane distortion correction can be returned to a state before the optical distortion correction.

The timing information TM in the metadata includes information of each of an exposure time (shutter speed), an exposure start timing, a reading time (curtain speed), the number of exposure frames (long-second exposure information), an IMU sample offset, and a frame rate.

These are mainly used to associate a line of each frame with the IMU data.

However, if the center of gravity of exposure is shifted by using an electronic shutter or a mechanical shutter even in a case where an image sensor 12a is a CCD or a CMOS of a global shutter scheme, it is possible to perform correction in accordance with the center of gravity of exposure using the exposure start timing and the curtain speed.

As the camera parameter CP in the metadata, an angle of view (focal length), a zoom position, and lens distortion information are described.

3. Functions of Image Processing Device

The image processing device 5 can perform interframe shake modification processing on the image file MF generated by imaging in the imaging device 1.

Figure 6:
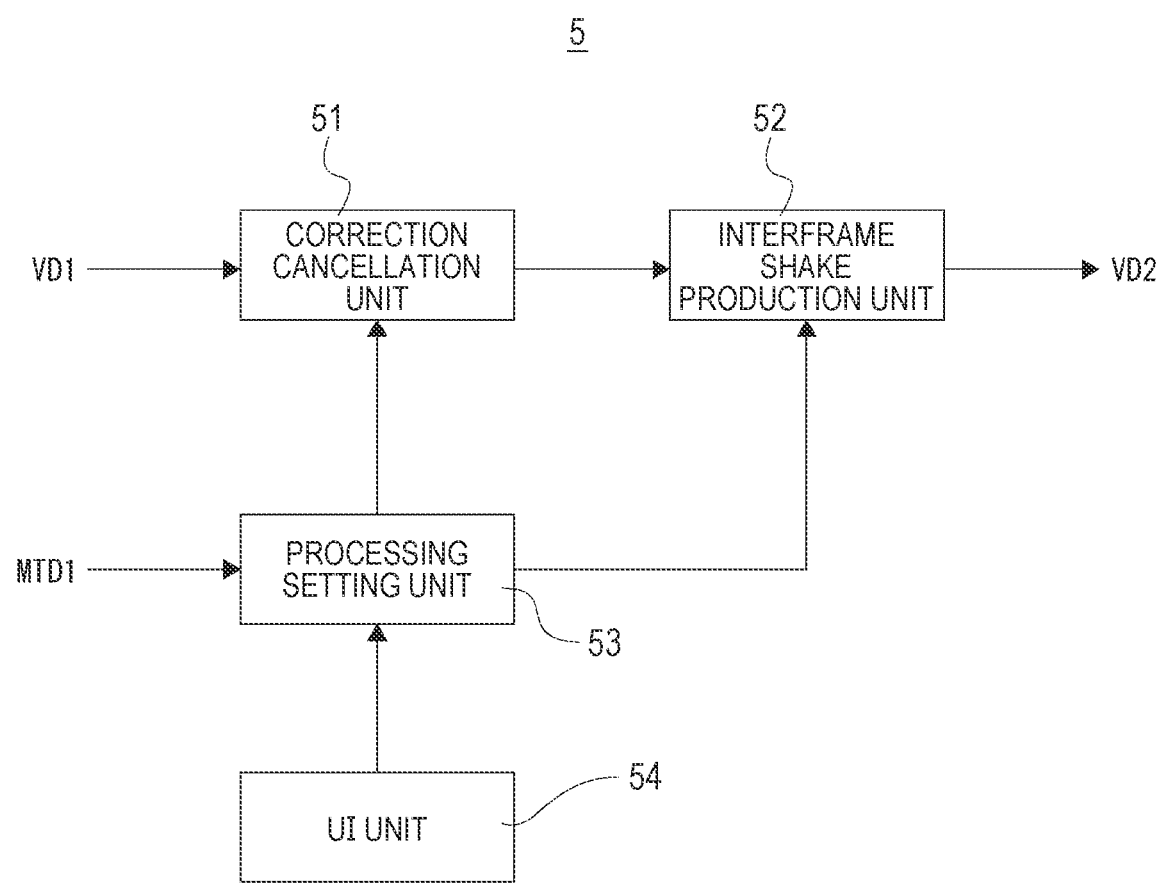
FIG. 6 is an explanatory diagram of functions of the image processing device according to the embodiment.

A functional configuration of the image processing device 5 for this purpose is illustrated in FIG. 6. Note that the image processing device 6 is assumed to have a similar configuration.

It is conceivable that the image processing device 5 is an information processing device such as the mobile terminal 7 or the personal computer 8 in FIG. 1, and functions as illustrated in FIG. 6, for example, are formed by an application program in such a case.

For example, the image processing device 5 has functions as a correction cancellation unit 51, an interframe shake production unit 52, a processing setting unit 53, and a user interface unit 54. Note that a "user interface" is also referred to as "UI", and the user interface unit 54 is hereinafter referred to as the "UI unit 54".

The correction cancellation unit 51 and the interframe shake production unit 52 are functions of performing some interframe shake modifications on an image.

The correction cancellation unit 51 is a function of performing an interframe shake modification to cancel the optical image stabilization and the electrical image stabilization that have been performed by the imaging device 1 and return to a state where the image stabilization has not been performed, that is, a state where an image is shaken by the original camera shake.

Alternatively, the correction cancellation unit 51 can also perform a process of canceling only correction performed by the image stabilization lens mechanism 10c, a process of canceling only correction performed by the imaging plane image stabilization unit 30, a process of canceling only the electrical image stabilization, and the like.

The interframe shake production unit 52 is a function of performing a process of changing a shake state of image data according to a parameter or an instruction input by the user.

The interframe shake production unit 52 can perform interframe shake production processing, such as addition or removal of a shake, with respect to the image data VD1 not subjected to cancellation processing in the correction cancellation unit 51 or the image data VD1 after being subjected to the cancellation processing by the correction cancellation unit 51, for example.

As the interframe shake production processing, a process of reducing a shake of an image, performing interframe shake reduction with higher accuracy than image stabilization of the imaging device 1, or applying a shake to an image is assumed.

The UI unit 54 is a function of performing a process of presenting an operation element related to the correction cancellation or the interframe shake modification to the user and acquiring operation information of the operation element.

The processing setting unit 53 sets a processing parameter for correction cancellation on the basis of the metadata MTD1, and causes the correction cancellation unit 51 to execute the processing. Furthermore, the processing setting unit 53 sets a processing parameter for the interframe shake modification according to an operation of the user detected by the UI unit 54 or the metadata MTD1, and causes the interframe shake production unit 52 to execute processing.

With such an image processing device 5, the user can perform a desired interframe shake modification on the image file MF obtained by the imaging device 1.

In particular, since the metadata MTD1 includes the information of the optical image stabilization, both the correction performed by the image stabilization lens mechanism 10c and the correction performed by the imaging plane image stabilization unit 30 can be recognized, and processing according to the both can be performed. For example, the cancellation of the image stabilization, the addition of an appropriate shake, and the like become possible.

4. First Embodiment

Hereinafter, various examples will be described as processing according to the embodiment, particularly focusing on optical image stabilization and recording of the metadata in accordance therewith.

For example, as illustrated in FIG. 5D, the imaging device 1 uses a body-side blur correction value and a lens-side blur correction value as metadata, and causes the metadata to be associated with image data as time-series information so that an interframe shake modification (correction cancellation or interframe shake production) using the body-side blur correction value and the lens-side blur correction value can be performed in the image processing device 5.

However, there is a circumstance that the amount of data of the metadata MTD1 increases if the body-side blur correction value and the lens-side blur correction value are recorded as the metadata for each frame as illustrated in FIG. 5D, which may be undesirable in some cases. For example, in a case where the body-side blur correction value and the lens-side blur correction value are recorded as the metadata for each frame in a moving image captured for a relatively long period of time, an increase in the amount of data of the image file MF becomes remarkable.

Thus, in the first embodiment, the amount of data of the metadata MTD1 can be reduced while the body-side blur correction value and the lens-side blur correction value can be detected in, for example, the image processing device 5 using the metadata MTD1.

Figure 7:
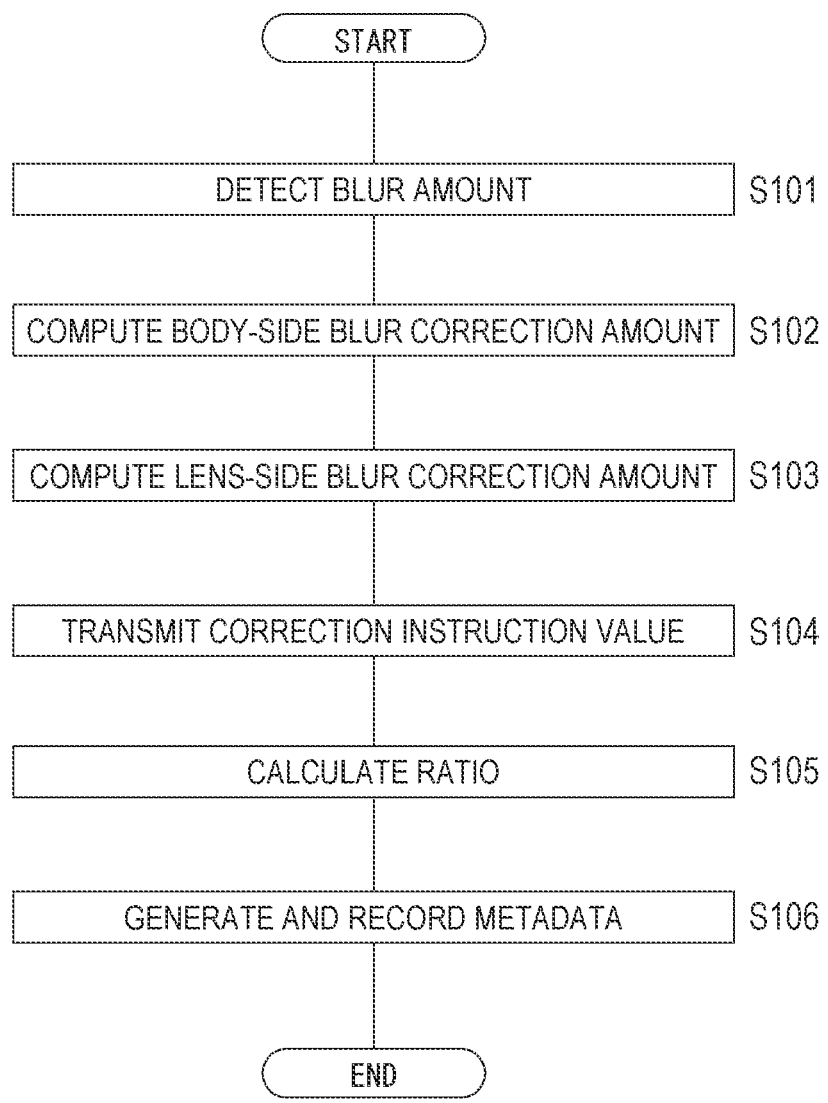
FIG. 7 is a flowchart of a processing example related to blur correction according to a first embodiment.

FIG. 7 illustrates a processing example of the control unit 40 (the camera control unit 18 and the like) in the camera body 2. FIG. 7 is a processing example related to blur correction executed by the control unit 40 for each timing of each frame at the time of recording a moving image.

In step S101, the control unit 40 detects a blur amount. For example, the amount of a shake generated between timings of a previous frame and a current frame is detected from IMU data of the blur detection unit 34. In this case, the IMU data of the blur detection unit 25 in the lens barrel 3 may be referred to.

In step S102, the control unit 40 computes a body-side blur correction amount. The body-side blur correction amount is the amount of correction executed by the imaging plane image stabilization unit 30.

Furthermore, in step S103, the control unit 40 computes a lens-side blur correction amount. The lens-side blur correction amount is the amount of correction executed by the image stabilization lens mechanism 10c.

For example, the control unit 40 calculates how much both the imaging plane image stabilization unit 30 and the image stabilization lens mechanism 10c should be operated to perform the blur correction on the basis of the blur amount applied to the imaging device 1 detected in step S101, and sets blur correction amounts for the both.

In this case, the control unit 40 calculates the blur correction amount of each of the imaging plane image stabilization unit 30 and the image stabilization lens mechanism 10c according to the magnitude of a blur, a frequency component of the blur (vibration), a movable range of the imaging plane image stabilization unit 30, a type and performance of the mounted lens barrel 3, and the like.

Note that one of reasons why the type and performance of the lens barrel 3 are considered in this case is that an interchangeable lens is assumed as the lens barrel 3. This is because the movable range of the image stabilization lens mechanism 10c is sometimes different depending on the lens barrel 3, and there may be a lens barrel that does not include the image stabilization lens mechanism 10c in the first place.

Then, when the entire blur correction amount with respect to the blur is set to "1", the control unit 40 obtains the respective blur correction amounts by setting the blur correction amount by the imaging plane image stabilization unit 30 to "α" and the blur correction amount by the image stabilization lens mechanism 10c to "1−α" (where 0≤α≤1).

In step S104, the control unit 40 transmits a correction instruction value corresponding to the blur correction amount.

That is, a correction instruction value giving an instruction on a position and a positional displacement amount for executing correction of the blur correction amount "α" is transmitted to the correction unit driving unit 32, and a correction instruction value giving an instruction on a position and a positional displacement amount for executing correction of the blur correction amount "1−α" is transmitted to the lens control unit 20.

Therefore, the correction unit driving unit 32 performs driving of the imaging plane image stabilization unit 30 corresponding to the blur correction amount "α".

Furthermore, the lens control unit 20 transmits the correction instruction value to the correction lens driving unit 23, and the correction lens driving unit 23 performs driving of the image stabilization lens mechanism 10c corresponding to the blur correction amount "1−α".

Therefore, the optical image stabilization is performed on both the lens barrel 3 side and the camera body 2 side, thereby functioning to reduce an image shake caused by a camera shake or the like applied to the imaging device 1.

In step S105, the control unit 40 calculates a ratio. The ratio is information indicating a ratio between the body-side correction value and the lens-side correction value. That is, the ratio is information indicating a ratio between the blur correction amount "α" and the blur correction amount "1−α".

Specific information regarding the ratio may be information indicating the ratio itself or information from which the ratio can be obtained. In the present embodiment, such ratio information is set as the conversion information.

The conversion information is information that enables one blur correction value to be obtained from another blur correction value, and is, for example, information for obtaining the lens-side blur correction value from the body-side blur correction value.

The ratio set as the conversion information may be information in a format of "α:(1−α)" or may be a value of "α" or "1−α". Furthermore, the conversion information may be information indicating "α" or "1−α" in percentage.

Furthermore, considering that the conversion information is, for example, a value that enables the lens-side blur correction value to be obtained from the body-side blur correction value, a division value as (lens-side blur correction value)/(body-side blur correction value) or a difference value between the lens-side blur correction value and the body-side blur correction value may be used.

In step S106, the control unit 40 performs a process of generating metadata regarding the optical image stabilization and recording the metadata as information corresponding to a current frame.

That is, the metadata including a set of the body-side blur correction value and the conversion information is generated and recorded in association with the current frame as illustrated in FIG. 5E.

The body-side blur correction value is the correction execution value or the correction instruction value as described above. In a case where the body-side blur correction value is the correction execution value, the control unit 40 detects actual position information of the image sensor through the position sensor of the imaging plane image stabilization unit 30, and sets the position information itself or a displacement amount of the position information from a timing of a previous frame as the body-side blur correction value.

In a case where the correction instruction value is set as the body-side blur correction value, the control unit 40 is only required to use the correction instruction value on which an instruction is given to the correction unit driving unit 32 in step S104 directly as the body-side blur correction value.

Note that the set of the body-side blur correction value and the conversion information is used as the metadata here, but an example in which a set of the lens-side blur correction value and the conversion information is used as the metadata is also conceivable. Of course, the conversion information in such a case is information that enables the body-side blur correction value to be obtained using the lens-side blur correction value.

As described above, if the body-side blur correction value and the conversion information are set as the metadata as time-series information for each frame, the lens-side blur correction value can also be calculated from the body-side blur correction value.

Then, it is unnecessary to record the lens-side blur correction value as the metadata, which contributes to reduction in recording capacity of the metadata.

For example, it is assumed that the body-side blur correction value and the lens-side blur correction value are used by 4 bytes in each of pitch, yaw, and roll directions. When the body-side blur correction value and the lens-side blur correction value are recorded as illustrated in FIG. 5D, 24 bytes are recorded in total.

On the other hand, the conversion information (for example, the value of "α" described above) may be 4 bytes similarly, but may be a smaller number of bytes. Even if 4 bytes are used, a total number of bytes is 16 bytes in the case of FIG. 5E, and the amount of data can be reduced. It is effective to reduce the data capacity particularly in a case where a moving image is recorded for a long period of time.

Furthermore, recording the body-side blur correction value and the conversion information is also suitable in a case where a speed of data communication from the lens control unit 20 to the camera control unit 18 is slow. That is, even if the actual lens-side blur correction value (correction execution value) is not obtainable from the lens control unit 20 in a timely manner, the metadata is recorded, and the lens-side blur correction value can be estimated from the conversion information.

Since the metadata is recorded as described above, for example, the image processing device 5 can offset the amount of blur correction performed on image information of each frame, that is, the correction amount indicated by the body-side blur correction value and the correction amount indicated by the lens-side blur correction value obtained from the conversion information. Furthermore, even in a case where the distortion correction has been performed by the image processing, a state in a case where the distortion correction is not performed is created using the information of the metadata MTD1, and an image in a case where the blur correction or the distortion correction is not performed can be created.

When the IMU data recorded as illustrated in FIG. 5C is then used, a blur amount of the camera body 2 can be re-calculated from information of the gyro sensor and the acceleration sensor, and the blur correction and the distortion correction can be performed again on the image in the state where the blur correction and the distortion correction are not performed described above. That is, the blur correction can also be implemented afterward on moving image data captured in the past.

Figure 8:
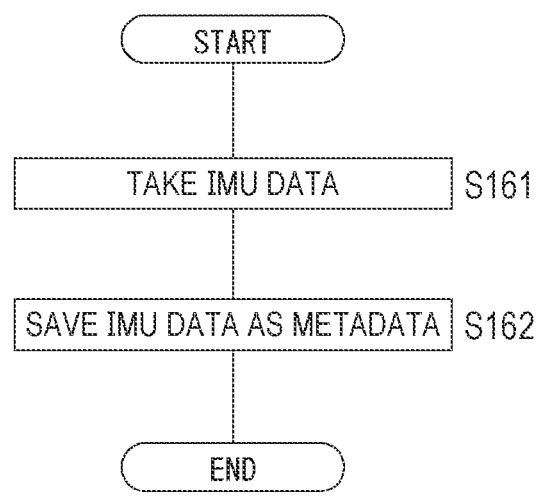
FIG. 8 is a flowchart of IMU data recording according to the embodiment.

Note that FIG. 8 illustrates processing of the IMU data performed by the control unit 40.

The control unit 40 takes the IMU data detected by the blur detection unit 34 in step S161 at each predetermined sampling timing, and performs processing for recording the IMU data as the metadata in step S162. As described in FIG. 5C, since the IMJ data is not necessarily synchronized with the frame timing of the moving image, for example, control is performed such that a plurality of pieces of the IMU data is recorded as the metadata per frame.

Therefore, pieces of the time-series IMU data are associated with the frames of the moving image.

It is assumed that such recording of the IMU data as the metadata is also executed in the case of each of the embodiments to be described hereinafter.

5. Second Embodiment

Figure 9:
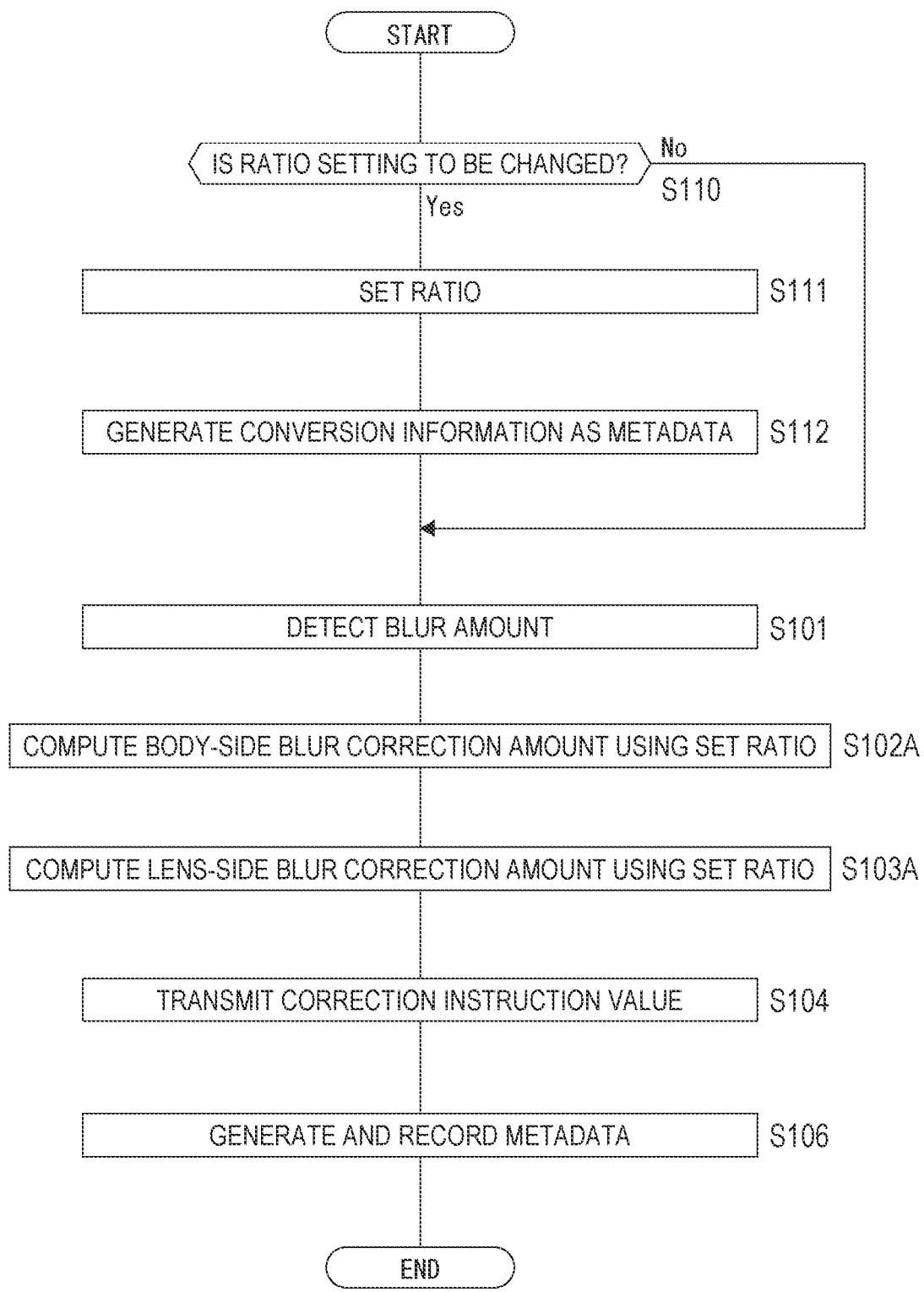
FIG. 9 is a flowchart of a processing example related to blur correction according to a second embodiment.

A processing example of the control unit 40 of the second embodiment is illustrated in FIG. 9. Note that the above-described processes are denoted by the same step numbers, and detailed overlapping description is avoided.

The processing example in FIG. 9 is an example in which a ratio between a body-side blur correction amount and a lens-side blur correction amount is made constant for a certain period.

The control unit 40 performs the processing of FIG. 9 at a timing corresponding to each frame of a moving image.

In step S110, the control unit 40 causes the processing to branch depending on whether or not it is a timing to change the ratio.

The timing to change the ratio is set, for example, as follows.

Start timing of moving image recording

Timing when a scene change is detected during moving image recording

Timing when recording is paused during moving image recording

Timing when zoom movement is performed during moving image recording

For example, at a time point of starting moving image recording, first, the ratio between the body-side blur correction amount and the lens-side blur correction amount is set. For example, a predetermined initial value may be set, or a ratio determined according to a type or a model of the lens barrel 3 may be used.

After the moving image recording starts, for example, an image content is analyzed, and a time point when the possibility of the scene change or the like is detected due to a change in a person or an object recognized as a subject, a change in an average luminance, a change in an average blur amount detected by the blur detection unit 34, or the like is used as a timing to change the setting of the ratio. This is for resetting to a more appropriate ratio according to a change in an imaging situation.

Similarly, the recording pause during the moving image recording is also used as the timing to change the setting of the ratio on the assumption of the possibility of the scene change.

Moreover, when the zoom lens 10a is operated during the moving image recording and an angle of view changes, the degree of an influence of a camera shake on an image changes, and thus, this is also used as the timing to change the setting of the ratio The above are examples, and other timings at which the setting of the ratio needs be changed are conceivable. In a case where it is determined in step S110 that it is the timing to change such a ratio, the control unit 40 proceeds to step S111 and sets a ratio between a body-side blur correction amount and a lens-side blur correction amount. That is, the setting of the ratio between the blur correction amounts is updated.

Then, in step S112, the control unit 40 performs a process of generating conversion information corresponding to the newly set ratio and recording the conversion information in association with a current frame.

When it is determined in step S110 that it is not the timing to change the ratio, steps S111 and S112 are not performed.

In step S101, the control unit 40 detects a blur amount.

In step S102A, the control unit 40 computes a body-side blur correction amount. Furthermore, in step S103A, the control unit 40 calculates a lens-side blur correction amount. In the computation in steps S102A and S103A, the body-side blur correction amount and the lens-side blur correction amount are obtained on the basis of the ratio most recently set in step S111.

In step S104, the control unit 40 transmits a correction instruction value corresponding to the body-side blur correction amount to the correction unit driving unit 32, and transmits a correction instruction value corresponding to the lens-side blur correction amount to the lens control unit 20, thereby causing both blur correction operations to be executed.

Then, in step S106, the control unit 40 performs a process of generating metadata regarding optical image stabilization and recording the metadata as information corresponding to a current frame.

At this time, if the ratio has been set at a time point of the current frame, a body-side blur correction value (correction effective value or correction instruction value) and the conversion information are set as the metadata regarding the optical image stabilization.

If the ratio has not been set at the time point of the current frame, only the body-side blur correction value is set as the metadata regarding the optical image stabilization.

Accordingly, the conversion information is recorded as the metadata only when the setting of the ratio is changed so that reduction of the amount of data as the metadata MTD1 can be promoted.

Note that, for example, in a case where there is no conversion information for a certain frame, it is needless to say that the image processing device 5 is only required to detect the conversion information retroactively from the frame.

6. Third Embodiment

Figure 10:
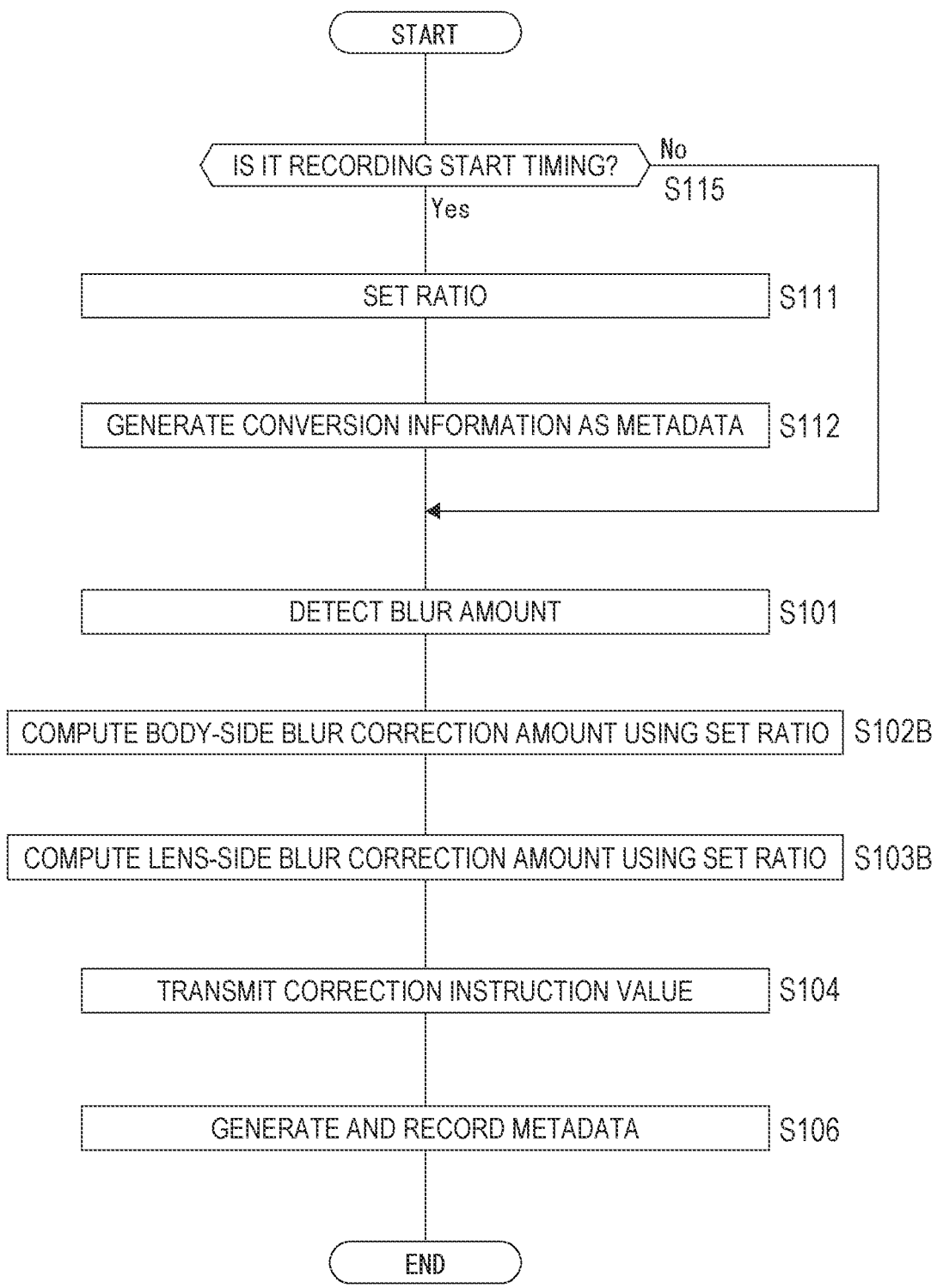
FIG. 10 is a flowchart of a processing example related to blur correction according to a third embodiment.

A processing example of the control unit 40 of the third embodiment is illustrated in FIG. 10.

The processing example of FIG. 10 is an example in which a ratio between a body-side blur correction amount and a lens-side blur correction amount is made constant for one-time moving image recording.

The control unit 40 performs the processing of FIG. 10 at a timing corresponding to each frame of a moving image.

Then, the control unit 40 proceeds from step S115 to step S111 and sets the ratio between the body-side blur correction amount and the lens-side blur correction amount only when the recording starts.

In step S112, the control unit 40 performs a process of generating conversion information indicating the newly set ratio or the like and recording the conversion information in association with a current frame (in this case, a head frame of the moving image).

The control unit 40 proceeds from step S115 to step S101 and does not perform the processes in steps S111 and S112 except when the recording starts.

In step S101, the control unit 40 detects a blur amount.

In step S102B, the control unit 40 computes a body-side blur correction amount. Furthermore, in step S103B, the control unit 40 calculates a lens-side blur correction amount. In the computation in steps S102B and S103B, the body-side blur correction amount and the lens-side blur correction amount are obtained on the basis of the ratio set in step S111 at the start of the moving image recording.

In step S104, the control unit 40 transmits a correction instruction value indicating the body-side blur correction amount to the correction unit driving unit 32, and transmits a correction instruction value indicating the lens-side blur correction amount to the lens control unit 20, thereby causing both blur correction operations to be executed.

Then, in step S106, the control unit 40 performs a process of generating metadata regarding optical image stabilization and recording the metadata as information corresponding to a current frame.

At this time, the body-side blur correction value and the conversion information are set as the metadata regarding the optical image stabilization at the time point of the head frame of the moving image.

For the second and subsequent frames, only the body-side blur correction value is set as the metadata regarding the optical image stabilization.

Accordingly, the conversion information is recorded as the metadata only for the head frame in the image file MF constituting the moving image, so that reduction of the amount of data as the metadata MTD1 can be promoted.

Note that, for example, in the image processing device 5, it is possible to know the ratio between the body-side blur correction value and the lens-side blur correction value for each frame by acquiring the conversion information of the head frame.

7. Fourth Embodiment

Figure 11:
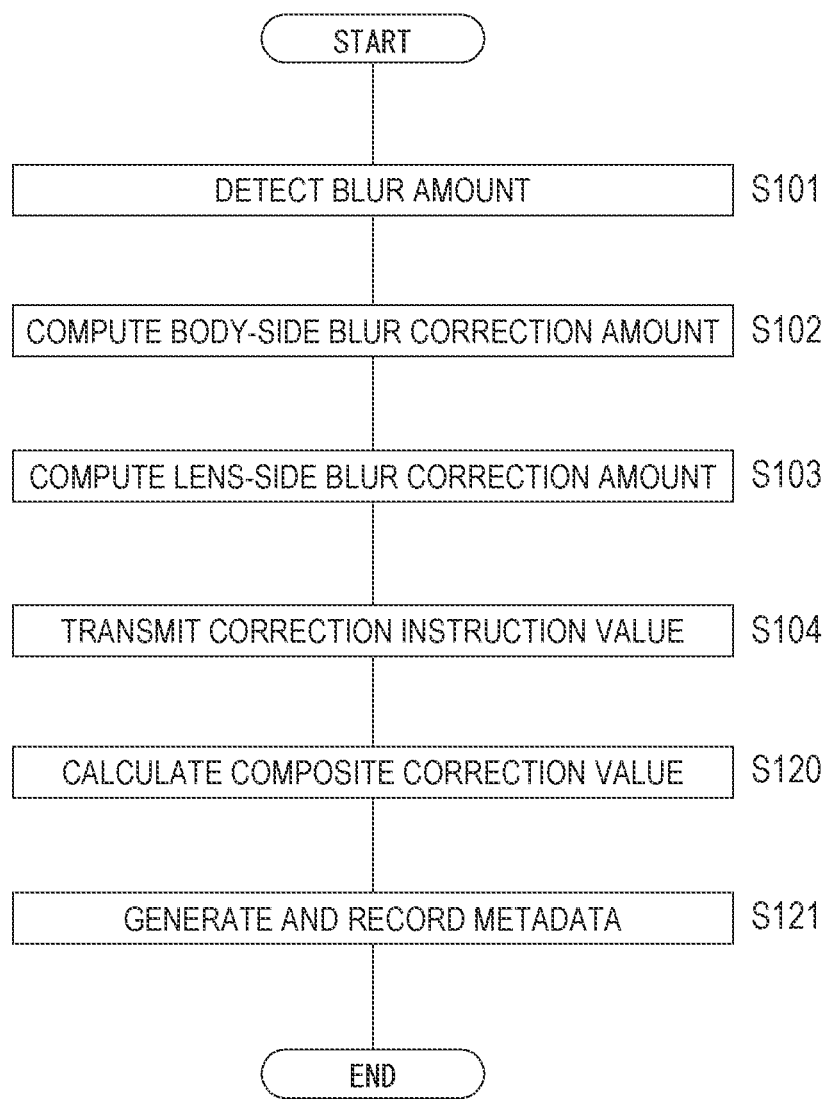
FIG. 11 is a flowchart of a processing example related to blur correction according to a fourth embodiment.

A processing example of the control unit 40 of the fourth embodiment is illustrated in FIG. 11.

The processing example of FIG. 11 is an example in which a composite correction value of a body-side blur correction value and a lens-side blur correction value is recorded as metadata as illustrated in FIG. 5F.

Steps S101 to S104 are similar to those in FIG. 7.

In step S120, the control unit 40 calculates the composite correction value of the body-side blur correction value and the lens-side blur correction value.

Then, in step S121, the control unit 40 performs a process of recording the composite correction value as the metadata regarding optical image stabilization in association with a current frame.

This is more effective to reduce the amount of data of the metadata MTD1.

Note that, for example, in the image processing device 5, the composite correction value can be detected for each frame, and thus, an interframe shake modification to cancel image stabilization can be performed by both the image stabilization lens mechanism 10c and the imaging plane image stabilization unit 30. In this case, for example, it is difficult to cancel only the correction by the image stabilization lens mechanism 10c, but there is an advantage in a use case where there is no request for such processing.

Conversely, in a case where it is desired to perform only cancellation processing on the entire image stabilization in the image processing device 5, it is also possible to obtain an advantage that it is unnecessary to obtain a combined blur correction amount of both the image stabilization lens mechanism 10c and the imaging plane image stabilization unit 30.

8. Fifth Embodiment

The fifth embodiment is based on the premise that both a body-side blur correction value and a lens-side blur correction value are recorded as metadata as illustrated in FIG. 5D.

Furthermore, the lens-side blur correction value is a correction execution value such as actual position information of the image stabilization lens mechanism 10c or a displacement amount thereof. Accordingly, the control unit 40 needs to wait for a notification of the lens-side blur correction value from the lens control unit 20.

Note that a correction amount of the image stabilization lens mechanism 10c of the lens barrel 3 may also be set on the camera control unit 18 side, and a correction instruction value may be transmitted to the lens control unit 20 in the fifth embodiment as well similarly to the first to fourth embodiments described above, but the lens control unit 20 may set the correction amount of the image stabilization lens mechanism 10c on the lens barrel 3 side.

That is, in this example, the camera control unit 18 sets a correction amount of the imaging plane image stabilization unit 30 according to a detection value of the blur detection unit 34 and executes optical image stabilization on the camera body 2 side, and the lens control unit 20 sets the correction amount of the image stabilization lens mechanism 10c according to a detection value of the blur detection unit 25 and executes optical image stabilization on the lens barrel 3 side.

Figure 12:
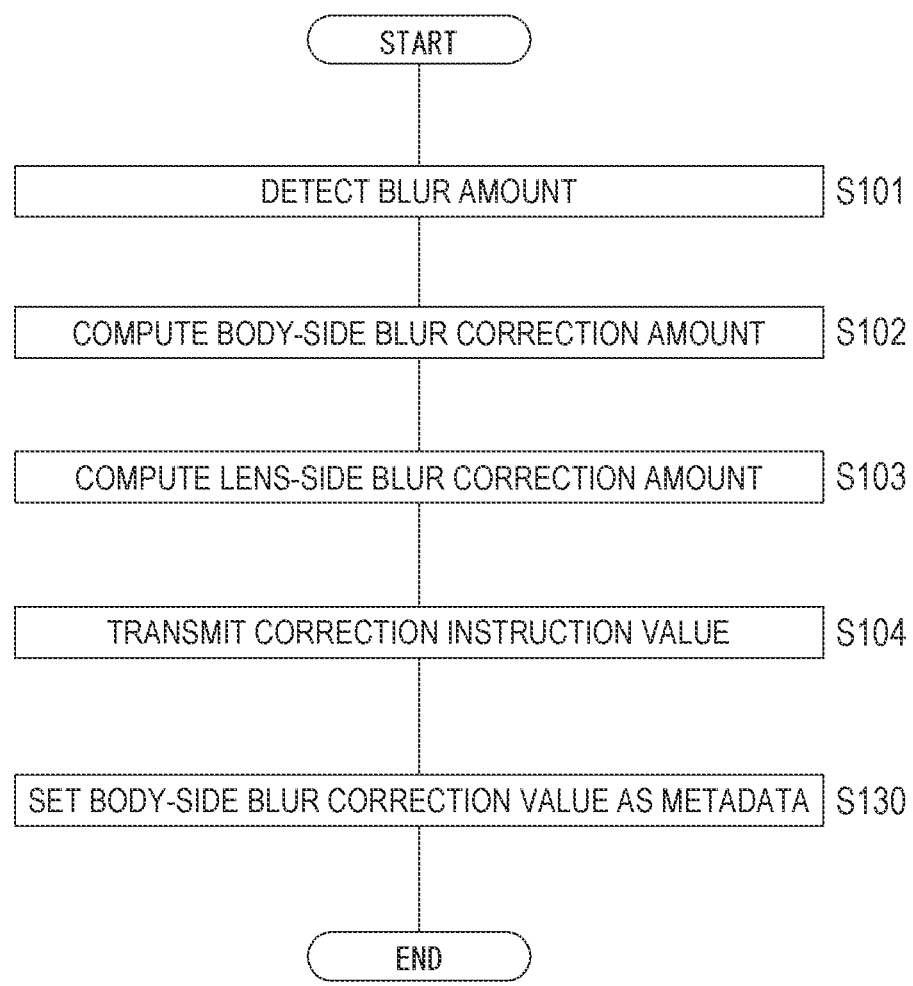
FIG. 12 is a flowchart of a processing example related to blur correction according to a fifth embodiment.

First, FIG. 12 illustrates a processing example of optical image stabilization performed by the control unit 40. This is an example in which the correction amount on the lens barrel 3 side is also set on the control unit 40 side, and steps S101 to S104 are similar to those in FIG. 7.

As described above, there is a case where the camera control unit 18 and the lens control unit 20 perform control on the camera body 2 side and the lens barrel 3 side, respectively.

In step S130 of FIG. 12, the control unit 40 acquires a body-side blur correction value sets the body-side blur correction value so as to be recorded as the metadata in association with a current frame at a predetermined time point.

Figure 13:
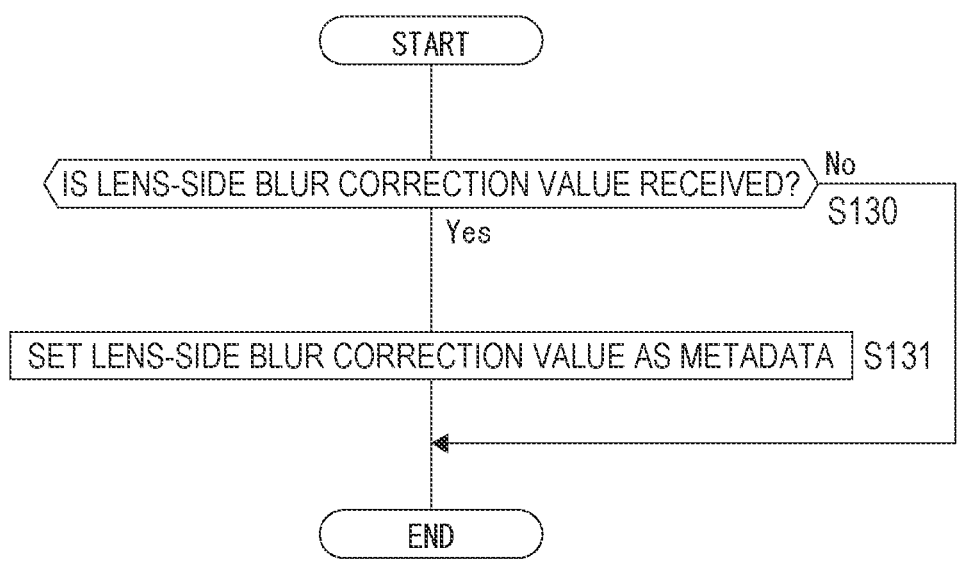
FIG. 13 is a flowchart of a processing example of metadata recording on a lens side according to the fifth embodiment.

The control unit 40 performs the processing of FIG. 13, for example, asynchronously with the processing of FIG. 12.

That is, in step S130, the control unit 40 determines whether or not the notification of the lens-side blur correction value has been received from the lens control unit 20, and in a case where the notification has been received, the lens-side blur correction value is set so as to be recorded in association with the current frame in step S131.

For example, both the body-side blur correction value and the lens-side blur correction value set as the metadata in step S130 of FIG. 12 and step S131 of FIG. 13 are recorded as the metadata corresponding to the certain frame as illustrated in FIG. 5D.

However, there may be a case where the lens-side blur correction value acquired by communication with the lens control unit 20 as in step S131 in FIG. 13 lacks accuracy as information or a case where sufficient data is not obtainable in time series.

For example, when a communication speed between the camera control unit 18 and the lens control unit 20 decrease, a case where the lens-side blur correction value is not obtainable for every frame may occur. Furthermore, a lens-side blur correction value of a different frame may be acquired in some cases.

Then, a case where the lens-side blur correction values are insufficient in the subsequent processing in the image processing device 5 is likely to occur depending on a situation of the communication speed.

Note that a communication speed between the camera body 2 side and the lens barrel 3 side varies particularly depending on a model and performance of the lens barrel 3. For example, in a case where the lens barrel 3 of an old model is mounted, the communication speed may decrease.

In consideration of the above circumstances, the control unit 40 performs processing as illustrated in FIG. 14A, and causes the image processing device 5 to perform processing as illustrated in FIG. 14B.

FIG. 14A illustrates an example in which the control unit 40 performs a process of recording information regarding a communication speed (for example, bits per second (bps)) as metadata.

In step S201, the control unit 40 detects and holds the communication speed information between the lens barrel 3 and the camera body 2, that is, between the lens control unit 20 and the camera control unit 18.

In step S202, the control unit 40 records the communication speed information together with image data in the metadata (see the broken line in FIG. 5B).

Note that the communication speed is only required to be recorded once for one moving image, for example, if a dominant factor of variation in the communication speed is the type of the lens barrel 3.

If there is a factor causing the variation in the communication speed during the moving image recording, it is conceivable to record the communication speed as the metadata in association with each frame.

The image processing device 5 that processes the image file MF performs processing of FIG. 14B.

In step S301, the image processing device 5 acquires the image data VD1 and the metadata MTD1 as the image file MF. For example, the image file MF is read from a recording medium. Alternatively, the image file MF transmitted from the imaging device 1 is received.

In step S302, the image processing device 5 extracts information of a communication speed included in the metadata MTD1, and compares the information with a threshold. This threshold is a threshold for determining whether the communication speed between the lens control unit 20 and the camera control unit 18 is in a fast state or a slow state. In other words, this threshold is a threshold for determining whether or not the lens-side blur correction value included in the metadata MTD1 is suitable for use in interframe shake modification processing.

If the communication speed is higher than the threshold, the image processing device 5 determines that high-speed communication is performed between the lens control unit 20 and the camera control unit 18 at the time of imaging the image file MF in the imaging device 1 so that the reliability of the lens-side blur correction value is maintained, and proceeds to step S303 to generate a compatibility flag.

In such a case, the image processing device 5 sets processing on the basis of the compatibility flag in step S305. Specifically, it is set such that the interframe shake modification processing using both the body-side blur correction value and the lens-side blur correction value can be performed.

On the other hand, if the communication speed is not higher than the threshold, the image processing device 5 determines that the communication between the lens control unit 20 and the camera control unit 18 is performed at a low speed at the time of imaging of the image file MF in the imaging device 1 so that the reliability of the lens-side blur correction value is not maintained, and proceeds to step S304 to generate an incompatibility flag.

In such a case, the image processing device 5 sets processing on the basis of the incompatibility flag in step S305. For example, it is set such that the lens-side blur correction value is unusable in the interframe shake modification processing.

This configuration can prevent interframe shake modification processing using an inappropriate lens-side blur correction value from being performed in the image processing device 5.

9. Sixth Embodiment

A processing example of the control unit 40 of the sixth embodiment is illustrated in FIG. 15A, and a processing example of the image processing device 5 is illustrated in FIG. 15B. Each of these is another processing example with the same purpose as that of each of FIGS. 14A and 14B described above.

FIG. 15A illustrates an example in which the control unit 40 performs a process of recording flag information as communication speed information.

In step S201, the control unit 40 detects and holds a communication speed (bps) between the lens barrel 3 and the camera body 2, that is, between the lens control unit 20 and the camera control unit 18.

In step S210, the control unit 40 compares the communication speed with a threshold. This threshold is a threshold for determining whether the communication speed between the lens control unit 20 and the camera control unit 18 is in a fast state or a slow state similarly to the threshold described in FIG. 14B.

If the communication speed is higher than the threshold, the control unit 40 proceeds to step S212 and generates a compatibility flag.

If the communication speed is not higher than the threshold, the control unit 40 proceeds to step S213 and generates an incompatibility flag.

Then, in step S214, the control unit 40 records the communication speed information together with image data in metadata (see the broken line in FIG. 5B). In this case, the compatibility flag or the incompatibility flag is recorded as the communication speed information.

The image processing device 5 that processes the image file MF performs processing of FIG. 15B.

In step S301, the image processing device 5 acquires the image data VD1 and the metadata MTD1 as the image file MF.

In step S310, the image processing device 5 sets processing on the basis of a compatibility flag or a non-compatibility flag recorded in the metadata MTD1. That is, if the compatibility flag can be confirmed, interframe shake modification processing using both a body-side blur correction value and a lens-side blur correction value can be performed on the current image file MF.

On the other hand, if the incompatibility flag is confirmed, it is set such that the lens-side blur correction value is unusable in the interframe shake modification processing for the current image file MF.

This configuration can also prevent interframe shake modification processing using an inappropriate lens-side blur correction value from being performed in the image processing device 5.

The speed information included in the metadata MTD1 may be, for example, 1-bit flag information, which is also advantageous for reduction of the amount of data of the metadata MTD1.

For example, regarding specific bits in the metadata MTD1, it is only required to set, for example, "0" and "1" as the compatibility flag and the incompatibility flag, respectively.

10. Seventh Embodiment

The example in which the control unit 40 uses the lens-side blur correction value received from the lens control unit 20 as the metadata as illustrated in FIG. 13 has been described in the fifth and sixth embodiments described above.

In such a case, an example in which the lens control unit 20 transmits a lens-side blur correction value while temporarily storing the lens-side blur correction value in the memory unit 26 is also conceivable, and will be described as a seventh embodiment.

A body-side blur correction value and a lens-side blur correction value are only required to be finally recorded as metadata of a moving image. Therefore, it is conceivable that the lens control unit 20 does not send the lens-side blur correction value in real time, but temporarily saves the lens-side blur correction value in the memory unit 26 and sends the lens-body blur correction value when there is a margin for lens-body communication.

For example, even in a case where the lens-body communication is very slow, a lost change in movement per time is great if the movement of the image stabilization lens mechanism 10c is sampled at an interval of the communication, and it is difficult to send the lens-side blur correction value in a state of maintaining the accuracy as data to the camera body 2 side in real time, processing of temporarily saving the lens-side blur correction value in the memory unit 26 and performing transmission afterward is advantageous.

Figure 16:
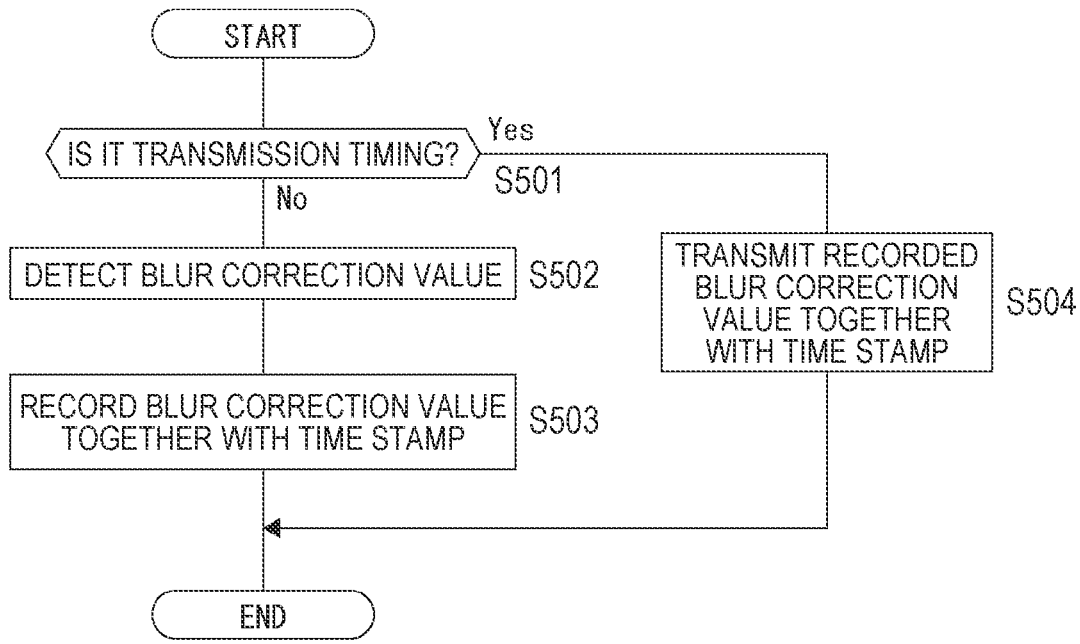
FIG. 16 is a flowchart of processing on a lens barrel side according to a seventh embodiment.

From such a viewpoint, the lens control unit 20 performs processing of FIG. 16 during capturing of a moving image or the like.

In step S501, the lens control unit 20 determines whether or not it is a transmission timing. The transmission timing is a certain set timing.

For example, it is conceivable to set regular transmission, irregular transmission, a timing depending on the storage capacity of the memory unit 26, a moving image recording end timing, and the like. In step S501, the lens control unit 20 determines whether or not such a timing currently comes in accordance with such a setting content.

If it is not the transmission timing, the lens control unit 20 proceeds to step S502 and detects a lens-side blur correction value as a correction execution value in the image stabilization lens mechanism 10c. Then, in step S503, the currently detected lens-side blur correction value is stored in the memory unit 26 in association with a time stamp indicating current time (time corresponding to a current frame).

This is because the time stamp needs to be transmitted as a set to the camera body 2 side in order to associate the lens-side blur correction value with a frame of the moving image.

If it is the transmission timing, the lens control unit 20 proceeds to step S504 and performs a process of transmitting the lens-side blur correction value recorded in the memory unit 26 to the camera control unit 18 together with the time stamp.

Through the processing of FIG. 16, when the set transmission timing comes, the lens-side blur correction values of a plurality of samples stored in the memory unit 26 are collectively transmitted to the camera control unit 18.

For example, batch transmission is performed every fixed period of time as a regular timing. Furthermore, batch transmission is performed in response to a certain trigger as an irregular timing. When the batch transmission is performed regularly or irregularly, transmission opportunities are reduced as compared with a case where the lens-side blur correction values are sequentially transmitted in real time, so that a communication load can be reduced.

Furthermore, batch transmission may be performed at a timing depending on the storage capacity of the lens-side blur correction values in the memory unit 26. Therefore, it is possible to avoid a situation in which it is difficult to store the lens-side blur correction value any more in the memory unit 26.

Furthermore, batch transmission is sometimes performed after the moving image capturing ends. Therefore, the transmission can be performed at a time point when there is a margin for communication.

These transmission timings may be used in combination.

Figure 17:
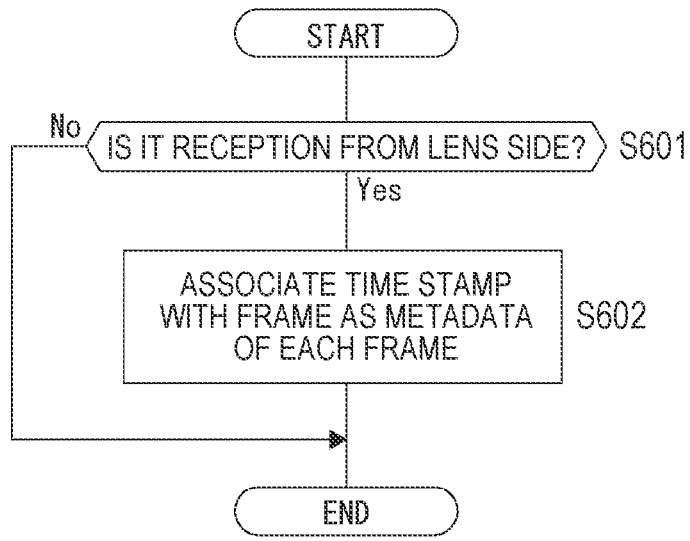
FIG. 17 is a flowchart of processing on a camera body side according to the seventh embodiment.

The control unit 40 performs processing of FIG. 17 together with the above-described processing of FIG. 12 at the time of recording a moving image.

In step S601 of FIG. 17, the control unit 40 waits for reception of lens-side blur correction values from the lens control unit 20.

When the lens-side blur correction values are received from the lens control unit 20, processing of setting the lens-side blur correction values as metadata is performed in step S602. At this time, time stamps are transmitted in association with the lens-side blur correction values, respectively. Therefore, the control unit 40 determines which frame of the moving image is associated with each of the received lens-side blur correction values using each of the time stamps and sets the lens-side blur correction value as the metadata associated with the determined frame.

A body-side blur correction value and the lens-side blur correction value set as the metadata in step S130 of FIG. 12 and step S602 of FIG. 17 are individually or simultaneously associated with a current frame and recorded as the metadata in a recording medium in the recording control unit 14.

Note that a user may select whether to transmit the lens-side blur correction value in real time or to temporarily store the lens-side blur correction value and transmit the lens-side blur correction value at a set timing as described above.

The transmission after the temporary storage has the advantage in terms of the communication load as described above, whereas the real-time transmission also has advantages that the memory unit 26 on the lens barrel 3 side can be reduced and a transmission time caused by the transmission performed afterward and a metadata processing time can be reduced. Thus, it is also appropriate to cause the user to make a choice according to a situation.

Furthermore, an example in which the real-time transmission and the transmission after the temporary storage are used together is also conceivable.

Figure 18:
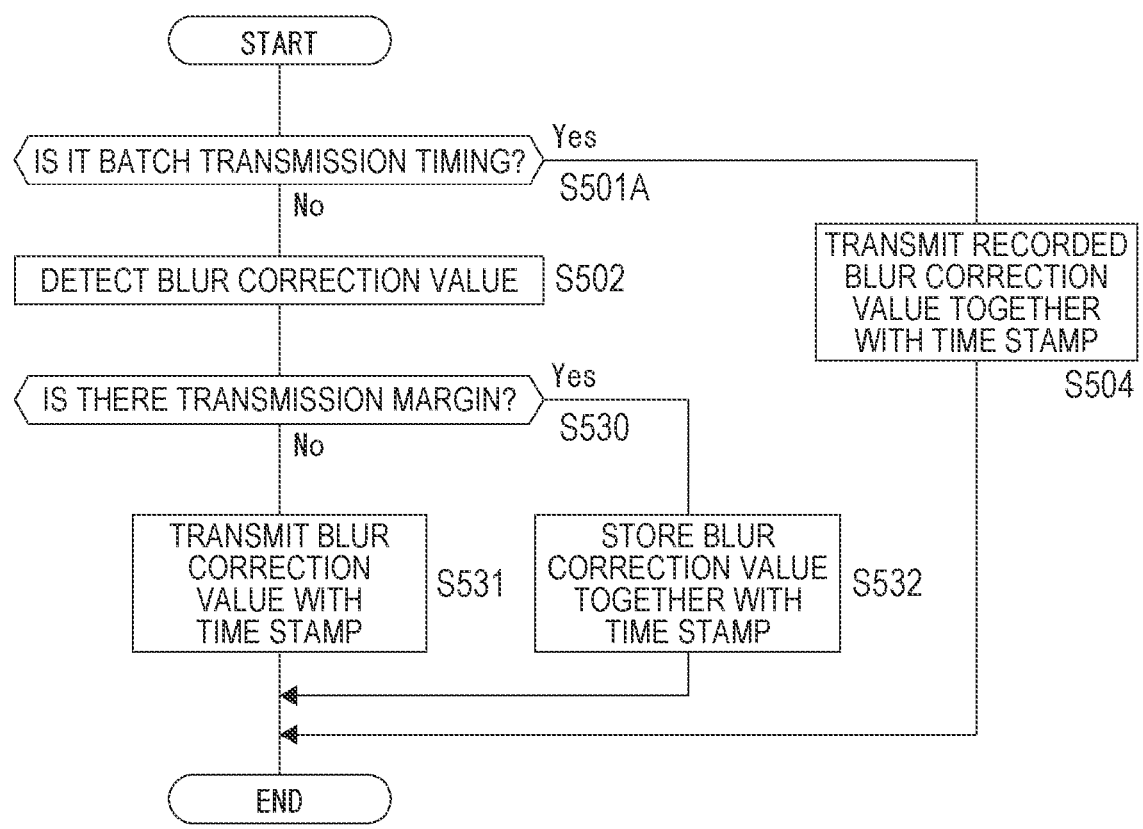
FIG. 18 is a flowchart of processing on a lens barrel side according to another example of the seventh embodiment.

FIG. 18 illustrates processing of the lens control unit 20.

In step S601A, the lens control unit 20 determines whether or not it is a transmission timing for batch transmission of lens-side blur correction values stored in the memory unit 26.

If it is not the transmission timing, the lens control unit 20 proceeds to step S502 and detects a lens-side blur correction value as a correction execution value in the image stabilization lens mechanism 10c.

In step S530, the lens control unit 20 determines whether or not there is a transmission margin in a current situation. For example, the presence or absence of the transmission margin is determined from a situation such as a current communication speed and the amount of data to be transmitted.

If there is the transmission margin, the lens control unit 20 proceeds to step S531, and transmits the currently detected lens-side blur correction value to the camera control unit 18 together with a time stamp.

On the other hand, if there is no transmission margin, in step S532, the currently detected lens-side blur correction value is stored in the memory unit 26 in association with the time stamp indicating current time (time corresponding to a current frame).

If it is the transmission timing in step S501A, the lens control unit 20 proceeds to step S504 and performs a process of transmitting the lens-side blur correction value recorded in the memory unit 26 to the camera control unit 18 together with the time stamp.

Through the processing of FIG. 18, the real-time transmission and the batch transmission after the temporary storage are used together regarding the lens-side blur correction value. All of them are paired with the time stamps, and thus, can be appropriately associated with frames of the moving image to serve as the metadata on the control unit 40 side.

When the real-time transmission is used together, there is also an advantage that the capacity of the memory unit 26 can be reduced.

11. Summary and Modifications

According to the above embodiments, the following effects can be obtained.

As described in the first to seventh embodiments, the imaging device 1 causes the control unit 40 to perform the processing of generating correction information based on both values of a body-side blur correction value (a first blur correction value) related to the imaging plane image stabilization unit 30 (a first blur correction function) of the camera body 2 and a lens-side blur correction value (a second blur correction value) related to the image stabilization lens mechanism 10c (a second blur correction function) in the lens barrel 3 and setting the correction information as metadata associated with a captured image.

That is, in a case where mechanical blur correction functions are provided on the lens barrel 3 side and the camera body 2 side, respectively, as the imaging device 1, the correction information based on the respective blur correction values is associated, as the metadata, with a moving image being captured.

Therefore, a shake state of the image can be changed at a later time, for example, in the image processing device 5 or the like. For example, both blur correction by the image stabilization lens mechanism 10c and blur correction by the imaging plane image stabilization unit 30 can be canceled, or only the blur correction of any one of the both can be canceled. Furthermore, in a case where the blur correction that has been performed by the imaging device 1 is canceled, more accurate blur correction can be performed in the image processing device 5, or interframe shake production of intentionally adding a shake can be performed.

Note that the description has been given in the embodiments focusing on mechanical blur prevention functions using the imaging plane image stabilization unit 30 and the image stabilization lens mechanism 10c, but the technology of the present disclosure can also be applied to a case of adopting an electrical image stabilization function. For example, in a case where blur correction is performed by the image stabilization lens mechanism 10c on the lens barrel 3 side and electrical image stabilization is performed on the camera body 2 side, the electrical image stabilization function may be considered as the first blur correction function and the image stabilization lens mechanism 10c may be considered as the second blur correction function.

In the examples described in the first, second, third, and fourth embodiments, the control unit 40 generates the correction information (information of the optical image stabilization in FIG. 5B, see FIGS. 5E and 5F) having the smaller amount of data than the amount of data obtained in a case where the respective data amounts of the body-side blur correction value and the lens-side blur correction value are added.

Therefore, the amount of data to be recorded as the metadata MTD1 can be reduced. In other words, the amount of data can be prevented from being unnecessarily increased in a case where it is desired to store the respective blur correction values on the lens barrel 3 side and the camera body 2 side.

In the examples described in the first, second, and third embodiments, the control unit 40 uses one blur correction value out of the body-side blur correction value and the lens-side blur correction value, and conversion information indicating a ratio, a division value, a difference value, or the like therebetween as the correction information for the optical image stabilization.

Therefore, the blur correction value by the image stabilization lens mechanism 10c and the blur correction value by the imaging plane image stabilization unit 30 can be obtained from the correction information recorded as the metadata, and it is possible to obtain similar effects as those in a case where each of these blur correction values is recorded as metadata. In this case, the amount of data to be recorded as the metadata can be reduced. In other words, the amount of data can be prevented from being unnecessarily increased in a case where it is desired to store the respective correction values on the lens barrel 3 side and the camera body 2 side.

Note that the example in which the blur correction value of the imaging plane image stabilization unit 30 and the conversion information are recorded as the metadata has been described in the first, second, and third embodiments, but the blur correction value of the image stabilization lens mechanism 10c and the conversion information may be recorded as the metadata. In this case, the conversion information may be information of the above-described ratio "α:(1−α)" or may be a value of "α" or "1−α" or the like. Furthermore, considering that the conversion information is, for example, a value that enables the body-side blur correction value to be obtained from the lens-side blur correction value, a division value as (body-side blur correction value)/ (lens-side blur correction value) or a difference value between the lens-side blur correction value and the body-side blur correction value may be used.

In the examples described in the first, second, and third embodiments, the control unit 40 uses the body-side blur correction value and the conversion information as the correction information for the optical image stabilization.

Therefore, the amount of data to be recorded as the metadata can be reduced, and moreover, the control unit 40 can generate the metadata without receiving the blur correction value on the lens barrel 3 side. Therefore, the metadata can be generated and recorded without being affected by a speed of communication between the camera control unit 18 and the lens control unit 20 or a delay in the communication.

In the example described in the first embodiment, the control unit 40 generates the correction information including a pair of one blur correction value out of the body-side blur correction value and the lens-side blur correction value and the conversion information at each predetermined timing, for example, at the timing of each frame.

Therefore, the blur correction value by the image stabilization lens mechanism 10c and the blur correction value by the imaging plane image stabilization unit 30 can be obtained, for example, for each frame from the metadata and correction cancellation and interframe shake production in the image processing device 5 or the like can be appropriately performed.

In the example described in the second embodiment, the control unit 40 generates the correction information including one blur correction value out of the body-side blur correction value and the lens-side blur correction value and the conversion information at a timing when a ratio between the body-side blur correction value and the lens-side blur correction value is converted.

Therefore, for example, it is unnecessary to record the conversion information for each frame every time, and the amount of data of the metadata MTD1 can be reduced.

In the example described in the third embodiment, the control unit 40 sets the ratio between the body-side blur correction value and the lens-side blur correction value to a fixed ratio from a recording start to a recording end of a moving image, and generates the correction information including one blur correction value out of the body-side blur correction value and the lens-side blur correction value at each timing and conversion information indicating the fixed ratio.

Therefore, for example, it is unnecessary to record the conversion information for each frame every time, and the amount of data of the metadata can be reduced. In particular, one piece of the conversion information is only required to be recorded in association with the moving image, and a data amount reduction effect is high.

In the example described in the fourth embodiment, the control unit 40 uses a composite correction value of the body-side blur correction value and the lens-side blur correction value as the correction information.

Therefore, the amount of data to be recorded as the metadata can be reduced. Furthermore, since the composite correction value indicates a total correction amount applied to an image, correction cancellation or the like can be appropriately executed in, for example, the image processing device 5 or the like.

In the examples described in the fifth and sixth embodiments, the control unit 40 sets the body-side blur correction value and the lens-side blur correction value as the correction information, and performs processing of recording communication speed information between the lens barrel 3 (lens control unit 20) and the camera body 2 (camera control unit 18) as metadata in a recording medium.

Therefore, whether or not information of the lens-side blur correction value is affected by the communication speed can be confirmed from the metadata. For example, in a case where the communication speed is low and the lens-side blur correction values are not sufficient, it is also possible not to perform correction cancellation or the like using these.

In the fifth embodiment, the communication speed information is a value indicating the communication speed (for example, bps). Therefore, it is possible to confirm whether or not the information of the lens-side blur correction value is delayed information, a degree of a delay, or the like from the metadata.

In the sixth embodiment, the communication speed information is result information (compatibility flag/incompatibility flag) obtained by comparing the communication speed with a predetermined value.

Therefore, whether or not the information of the lens-side blur correction value is delayed can be easily confirmed from the metadata.

The example in which the blur correction value as the body-side blur correction value or the lens-side blur correction value is a correction execution value indicating a position or a positional displacement amount according to correction of the blur correction function (the imaging plane image stabilization unit 30 or the image stabilization lens mechanism 10c) has been described in the embodiments.

This is a value indicating a correction amount actually affecting the image, and is the most accurate value in consideration of correction cancellation in the image processing device 5 or the like, for example.

Furthermore, the example in which the blur correction value is a correction instruction value that gives an instruction on a position or a positional displacement amount for correction of the blur correction function has been described in the embodiments.

The correction instruction value is not a value directly indicating a blur correction amount actually applied to the image, but has no problem as a value indicating substantially the actual blur correction amount if the operation accuracy of the blur correction function with respect to the instruction is high. Furthermore, the correction instruction value is generated by the camera control unit 18, and thus, there is an advantage that the metadata can be generated and recorded without being affected by communication with the lens barrel 3.

The example in which the control unit 40 records information (IMU data) detected by the blur detection unit 34 as the metadata has been described in the embodiments.

Since the IMU data as information of a shake actually applied to the imaging device 1 is recorded as the metadata, the shake actually affecting the image can be determined from the metadata. Therefore, various interframe shake modifications become possible.

Note that the effects described in the present specification are merely examples and are not limited, and there may be other effects.

Note that the present technology can also have the following configurations.

(1)

An Imaging Device Including
a control unit that generates, as metadata associated with a captured image, correction information based on both a first blur correction value related to a first blur correction function of correcting a positional relationship between an optical image incident through a lens and an output captured image and a second blur correction value related to a second blur correction function provided in a lens barrel including the lens.

(2)

The imaging device according to (1) described above, in which
the control unit
generates the correction information having a smaller amount of data than an amount of data obtained in a case where an amount of data of the first blur correction value and an amount of data of the second blur correction value are added.

(3)

The imaging device according to (1) or (2) described above, in which
the control unit sets
one blur correction value out of the first blur correction value and the second blur correction value and
conversion information configured to obtain another blur correction value using the one blur correction value as the correction information.

(4)

The imaging device according to any one of (1) to (3) described above, in which
the control unit sets
the first blur correction value and
conversion information configured to obtain the second blur correction value using the first blur correction value
as the correction information.

(5)

The imaging device according to any one of (1) to (4) described above, in which
the control unit
generates the correction information including a pair of one blur correction value out of the first blur correction value and the second blur correction value and conversion information configured to obtain another blur correction value using the one blur correction value every predetermined timing.

(6)

The imaging device according to any one of (1) to (4) described above, in which
the control unit
generates the correction information including
one blur correction value out of the first blur correction value and the second blur correction value at each timing and
conversion information configured to obtain another blur correction value using the one blur correction value at a timing when a ratio between the first blur correction value and the second blur correction value has changed.

(7)

The imaging device according to any one of (1) to (4) described above, in which
the control unit
sets a ratio between the first blur correction value and the second blur correction value to a fixed ratio from a recording start to a recording end of a moving image, and
generates the correction information including
one blur correction value out of the first blur correction value and the second blur correction value at each timing and
conversion information according to the fixed ratio, the conversion information being configured to obtain another blur correction value using the one blur correction value.

(8)

The imaging device according to (1) or (2) described above, in which
the control unit
sets a composite correction value of the first blur correction value and the second blur correction value as the correction information.

(9)

The imaging device according to (1) described above, in which
the control unit
sets the first blur correction value and the second blur correction value as the correction information, and
performs processing of recording communication speed information between the lens barrel and a camera body portion as metadata in a recording medium.

(10)

The imaging device according to (9) described above, in which
the communication speed information is a value indicating a communication speed.

(11)

The imaging device according to (9) described above, in which
the communication speed information is result information obtained by comparing a communication speed with a predetermined value.

(12)

The imaging device according to any one of (1) to (11) described above, in which
a blur correction value is a correction execution value indicating a position or a positional displacement amount according to correction of a blur correction function.

(13)

The imaging device according to any one of (1) to (11) described above, in which
a blur correction value is a correction instruction value that gives an instruction on a position or a positional displacement amount for correction of a blur correction function.

(14)

The imaging device according to any one of (1) to (13) described above, in which
the control unit sets shake information detected by a shake detection unit as metadata.

(15)

An Imaging Method Including
processing of generating, as metadata associated with a captured image, correction information based on both a first blur correction value related to a first blur correction function of correcting a positional relationship between an optical image incident through a lens and an output captured image and a second blur correction value related to a second blur correction function provided in a lens barrel including the lens, the processing being performed by an imaging device.

REFERENCE SIGNS LIST

1 Imaging device
2 Camera body
3 Lens barrel
5, 6 Image processing device
10 Lens system
10a Zoom lens
10b Diaphragm mechanism
10c Image stabilization lens mechanism
10d Focus lens
11 Shutter
12 Imaging element unit
13 Camera signal processing unit
14 Recording control unit
15 Display unit
16 Output unit
17 Operation unit
18 Camera control unit
19, 26 Memory unit
20 Lens control unit
21 Zoom driving unit
22 Diaphragm driving unit
23 Correction lens driving unit
24 Focus driving unit
25, 34 Blur detection unit
27, 33 Communication control unit
30 Imaging plane image stabilization unit
31 Shutter driving unit
32 Correction unit driving unit
35 Electrical image stabilization control unit
36 Blur correction metadata processing unit
40 Control unit

The invention claimed is:

1. An imaging device comprising:
a control circuitry configured to
generate, as metadata associated with a captured image, correction information based on both a first blur correction value and a second blur correction value,
wherein the first blur correction value has a first amount of data and is related to a first blur correction function of correcting a positional relationship between an optical image incident through a lens and an output captured image,
wherein the second blur correction value has a second amount of data and is related to a second blur correction function provided in a lens barrel including the lens,
wherein the correction information has a third amount of data that is less than a combination of the first amount of data and the second amount of data.

2. The imaging device according to claim 1, wherein the correction information includes:
one blur correction value of the first blur correction value or the second blur correction value, and
conversion information configured to obtain another blur correction value using the one blur correction value.

3. The imaging device according to claim 1, wherein the correction information includes:
the first blur correction value, and
conversion information configured to obtain the second blur correction value using the first blur correction value.

4. The imaging device according to claim 1, wherein the control circuitry is further configured to generate, at every predetermined timing, the correction information including a pair of:
one blur correction value of the first blur correction value or the second blur correction value, and
conversion information configured to obtain another blur correction value using the one blur correction value.

5. The imaging device according to claim 1, wherein the control circuitry is further configured to generate the correction information including:
one blur correction value of the first blur correction value or the second blur correction value at each timing, and
conversion information configured to obtain another blur correction value using the one blur correction value at a timing when a ratio between the first blur correction value and the second blur correction value has changed.

6. The imaging device according to claim 1, wherein the control circuitry is further configured to:
set a ratio between the first blur correction value and the second blur correction value to a fixed ratio from a recording start to a recording end of a moving image, and
generate the correction information including:
one blur correction value of the first blur correction value or the second blur correction value at each timing, and
conversion information according to the fixed ratio, the conversion information being configured to obtain another blur correction value using the one blur correction value.

7. The imaging device according to claim 1, wherein the correction information includes a composite correction value of the first blur correction value and the second blur correction value.

8. The imaging device according to claim 1, wherein the control circuitry is further configured to:
generate, as second metadata associated with the captured image, second correction information based on both the first blur correction value and the second blur correction value, the second correction information includes the first blur correction value and the second blur correction value, and
record communication speed information between the lens barrel and a camera body portion as third metadata in a recording medium.

9. The imaging device according to claim 8, wherein the communication speed information is a value indicating a communication speed.

10. The imaging device according to claim 8, wherein the communication speed information is result information obtained by comparing a communication speed with a predetermined value.

11. The imaging device according to claim 1, wherein a blur correction value is a correction execution value indicating a position or a positional displacement amount according to correction of a blur correction function.

12. The imaging device according to claim 1, wherein
a blur correction value is a correction instruction value that gives an instruction on a position or a positional displacement amount for correction of a blur correction function.

13. The imaging device according to claim 1, wherein
the control circuitry is further configured to generate second metadata including shake information detected by a shake detection unit.

14. An imaging method comprising:
receiving, with control circuitry, a first blur correction value;
receiving, with the control circuitry, a second blur correction value; and
generating, as metadata associated with a captured image, correction information based on both the first blur correction value and the second blur correction value,
wherein the first blur correction value has a first amount of data and is related to a first blur correction function of correcting a positional relationship between an optical image incident through a lens and an output captured image,
wherein the second blur correction value has a second amount of data and is related to a second blur correction function provided in a lens barrel including the lens, and
wherein the correction information has a third amount of data that is less than a combination of the first amount of data and the second amount of data.

15. The imaging method according to claim 14, wherein
the correction information includes:
one blur correction value of the first blur correction value or the second blur correction value, and
conversion information configured to obtain another blur correction value using the one blur correction value.

16. The imaging method according to claim 14, wherein
the correction information includes:
the first blur correction value, and
conversion information configured to obtain the second blur correction value using the first blur correction value.

17. The imaging method according to claim 14, wherein
generating, as the metadata associated with the captured image, the correction information based on both the first blur correction value and the second blur correction value further includes generating, at every predetermined timing, the correction information including a pair of:
one blur correction value of the first blur correction value or the second blur correction value, and
conversion information configured to obtain another blur correction value using the one blur correction value.

18. The imaging method according to claim 14, wherein
the correction information includes a composite correction value of the first blur correction value and the second blur correction value.

19. The imaging method according to claim 14, further comprising:
generating, as second metadata associated with the captured image, second correction information based on both the first blur correction value and the second blur correction value, the second correction information includes the first blur correction value and the second blur correction value; and
recording communication speed information between the lens barrel and a camera body portion as third metadata in a recording medium.

20. The imaging method according to claim 14, further comprising:
generating second metadata including shake information detected by a shake detection unit.

* * * * *